United States Patent
Park et al.

(10) Patent No.: US 12,260,510 B2
(45) Date of Patent: Mar. 25, 2025

(54) IMAGE PROCESSING APPARATUS FOR WEIGHT-BASED IMAGE TRANSFORMATION AND OPERATING METHOD THEREOF

(71) Applicant: SAMSUNG ELECTRONICS CO., LTD., Suwon-si (KR)

(72) Inventors: Dubok Park, Suwon-si (KR); Woongil Choi, Suwon-si (KR); Jaehee Kwak, Suwon-si (KR); Jaehyeon Bae, Suwon-si (KR); Youngho Oh, Suwon-si (KR); Sungho Lee, Suwon-si (KR); Seungsoo Jeong, Suwon-si (KR); Narae Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 333 days.

(21) Appl. No.: 17/752,603

(22) Filed: May 24, 2022

(65) Prior Publication Data
US 2022/0383450 A1    Dec. 1, 2022

Related U.S. Application Data

(63) Continuation of application No. PCT/KR2022/007304, filed on May 23, 2022.

(30) Foreign Application Priority Data

May 24, 2021    (KR) .................. 10-2021-0066492

(51) Int. Cl.
G06T 3/40    (2024.01)
G06T 3/10    (2024.01)
G06T 7/11    (2017.01)

(52) U.S. Cl.
CPC .......... *G06T 3/40* (2013.01); *G06T 3/10* (2024.01); *G06T 7/11* (2017.01); *G06T 2207/20021* (2013.01); *G06T 2207/20212* (2013.01)

(58) Field of Classification Search
CPC ..... G06T 3/40; G06T 3/10; G06T 7/11; G06T 2207/20021; G06T 2207/20212; G06T 3/04; G06T 3/4007; G06T 5/00
See application file for complete search history.

(56) References Cited

U.S. PATENT DOCUMENTS 7,873,211 B1 *   1/2011   Grundmann ............ G06T 3/04
                                                   382/284
8,659,622 B2 *   2/2014   Dhawan .................. G06T 3/04
                                                   345/626
(Continued)

FOREIGN PATENT DOCUMENTS

CN    109447903 A    3/2019
KR    10-0988380 B1  10/2010
(Continued)

OTHER PUBLICATIONS

Park, Dubok. "Two-directional Image Retargeting with Region-Aware Texture Enhancement." BMVC. 2021. (Year: 2021).*
(Continued)

*Primary Examiner* — Andrae S Allison
(74) *Attorney, Agent, or Firm* — Sughrue Mion, PLLC

(57) ABSTRACT

An image processing apparatus includes: a memory; and a processor configured to execute one or more instructions stored in the memory to: determine a scale weight for each pixel of original pixels in an original image based on first attribute-related information set by dividing the original image into an object region and a peripheral region, respectively; determine an additional weight for at least one pixel of the original pixels in the peripheral region, based on the
(Continued)

first attribute-related information, and second attribute-related information that is based on an amount of a change between pixel values of adjacent pixels; and obtain a transformed image of which a size is changed from the original image, by applying at least one of the scale weight and the additional weight to corresponding pixels of the original pixels to obtain a pixel value of a transformed pixel in the transformed image.

15 Claims, 18 Drawing Sheets

(56) References Cited

U.S. PATENT DOCUMENTS

| | | | |
|---|---|---|---|
| 8,792,744 B2* | 7/2014 | Conger | G06T 3/04 |
| | | | 382/298 |
| 8,873,887 B2* | 10/2014 | Datar | G06V 30/224 |
| | | | 382/298 |
| 11,003,951 B2 | 5/2021 | Lim et al. | |
| 2010/0259683 A1* | 10/2010 | Setlur | G06T 3/40 |
| | | | 348/E9.037 |
| 2012/0070129 A1* | 3/2012 | Lin | G06F 40/103 |
| | | | 386/278 |
| 2013/0121619 A1* | 5/2013 | Intwala | G06T 3/04 |
| | | | 382/298 |
| 2013/0342758 A1 | 12/2013 | Greisen et al. | |
| 2014/0355868 A1* | 12/2014 | Huang | A63F 13/25 |
| | | | 382/154 |
| 2020/0210766 A1* | 7/2020 | Lim | H04N 21/44008 |
| 2021/0287344 A1 | 9/2021 | Chuo et al. | |
| 2022/0012897 A1 | 1/2022 | Park et al. | |
| 2022/0020113 A1* | 1/2022 | Meschiari | G06T 3/403 |
| 2024/0161302 A1* | 5/2024 | Gilra | G06T 7/11 |

FOREIGN PATENT DOCUMENTS

| | | |
|---|---|---|
| KR | 10-2015-0090453 A | 8/2015 |
| KR | 10-2051597 B1 | 12/2019 |
| KR | 10-2020-0057477 A | 5/2020 |
| KR | 10-2020-0079697 A | 7/2020 |
| KR | 10-2337835 B1 | 12/2021 |
| WO | 2020101300 A1 | 5/2020 |

OTHER PUBLICATIONS

W. Dong, F. Wu, Y. Kong, X. Mei, T.-Y. Lee and X. Zhang, "Image Retargeting by Texture-Aware Synthesis," in IEEE Transactions on Visualization and Computer Graphics, vol. 22, No. 2, pp. 1088-1101, Feb. 1, 2016, (Year: 2016).*

Shafieyana et al, Image retargeting using depth assisted saliency map, Signal Processing: Image Communication 50 (2017) 34-43 (Year: 2017).*

International Search Report and Written Opinion dated Aug. 24, 2022, issued by the International Searching Authority in International Application No. PCT/KR2022/007304 (PCT/ISA/220, 210, 237).

Shafieyan et al., "Image retargeting using depth assisted saliency map," ELSEVIER, Signal Processing: Image Communication, vol. 50, pp. 34-43, 2017, Total 11 pages.

Park, Dubok, "Edge-Guided Inage Downscaling With Adaptive Filtering", ICIP 2020, IEEE, 2020, pp. 998-1002. (5 pages total).

Huang, Zhewei et al., "RIFE: real-Time Intermediate Flow Estimation for Video Frame Interpolation", arXiv:2011.06294v11 [cs.CV], Nov. 17, 2021, pp. 1-12. (12 pages total).

Nam, Hyunwoo et al., "Jitter-Robust Video Retargeting With Kalman Filter and Attention Saliency Fusion Network", ICIP 2020, IEEE, 2020, pp. 858-862. (5 pages total).

Yan, Bo et al., "Codebook Guided Feature-Preserving for Recognition-Oriented Image Retargeting", IEEE, 2016, pp. 1-11. (11 pages total).

Lau, Chun Pong et al., "Image retargeting via Beltrami representation", IEEE, 2018, pp. 1-15. (15 pages total).

Song, Eungyeol et al., "CarvingNet: Content-Guided Seam Carving Using Deep Convolution Neural Network", IEEE Access, Jan. 4, 2019, vol. 7, pp. 284-292. (9 pages total).

Lee, Ho Sub et al., "SmartGrid: Video Retargeting With Spatiotemporal Grid Optimization", IEEE Access, Sep. 19, 2019, vol. 7, pp. 127564-127579. (16 pages total).

Lee, Seung Joon et al., "Object Detection-based Video Retargeting with Spatial-Temporal Consistency", IEEE, 2020, pp. 1-6. (6 pages total).

Oliveira, Saulo A.F. et al., "A bi-directional evaluation-based approach for image retargeting quality assessment", Computer Vision and Image Understanding, vol. 168, 2018, pp. 172-181. (10 pages total).

Shao, Feng et al., "Transformation-Aware Similarity Measurement for Image Retargeting Quality Assessment via Bidirectional Rewarping", IEEE Transactions on Systems, Man, and Cybernetics: Systems, 2019, pp. 1-15. (15 pages total).

Communication dated Sep. 12, 2024, issued by the European Patent Office in European Application No. 22811595.2.

Jiangyang Zhang et al., "Compressed-Domain Video Retargeting," IEEE Transactions on Image Processing, vol. 23, No. 2, pp. 797-809, Feb. 2014, XP011536819.

* cited by examiner

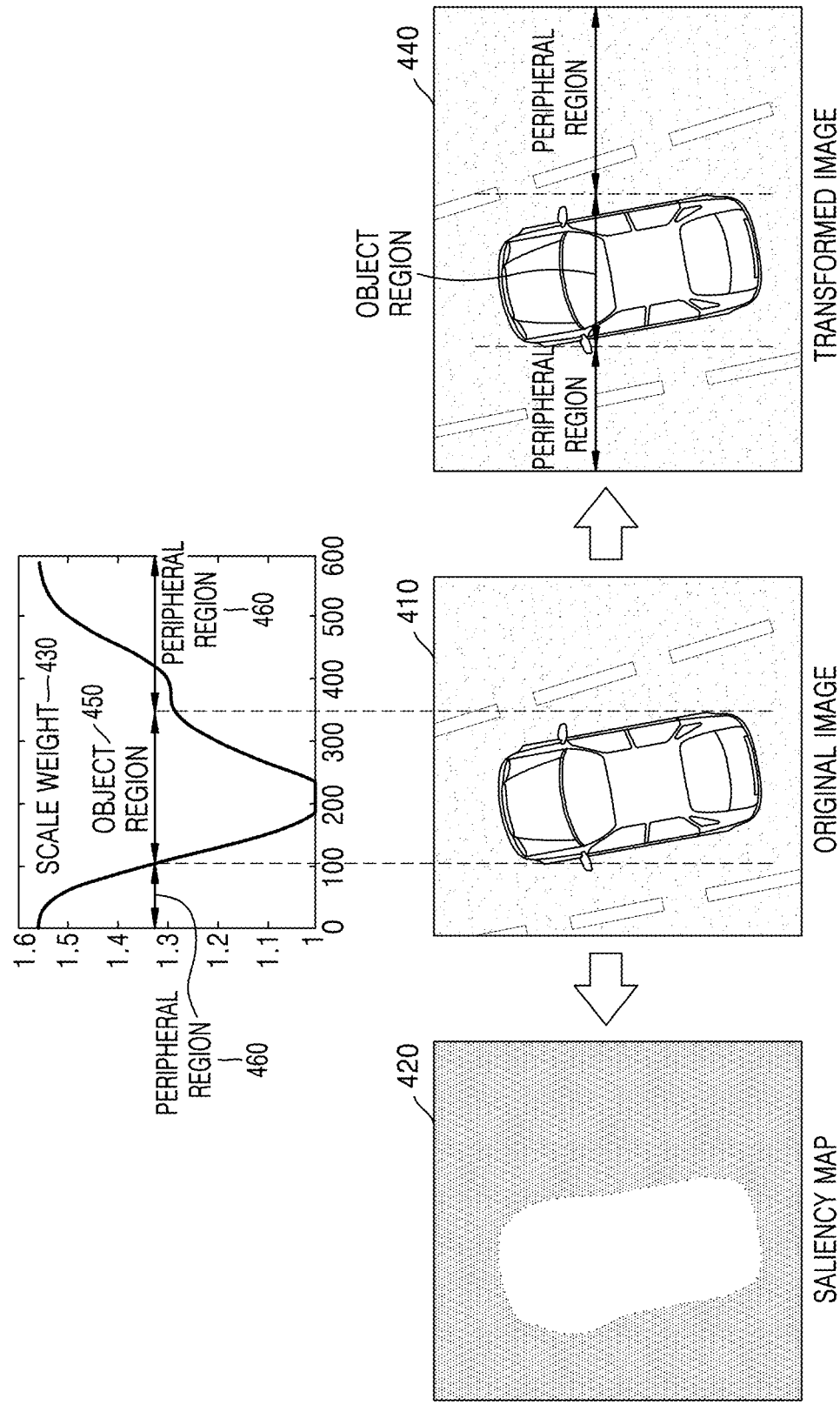

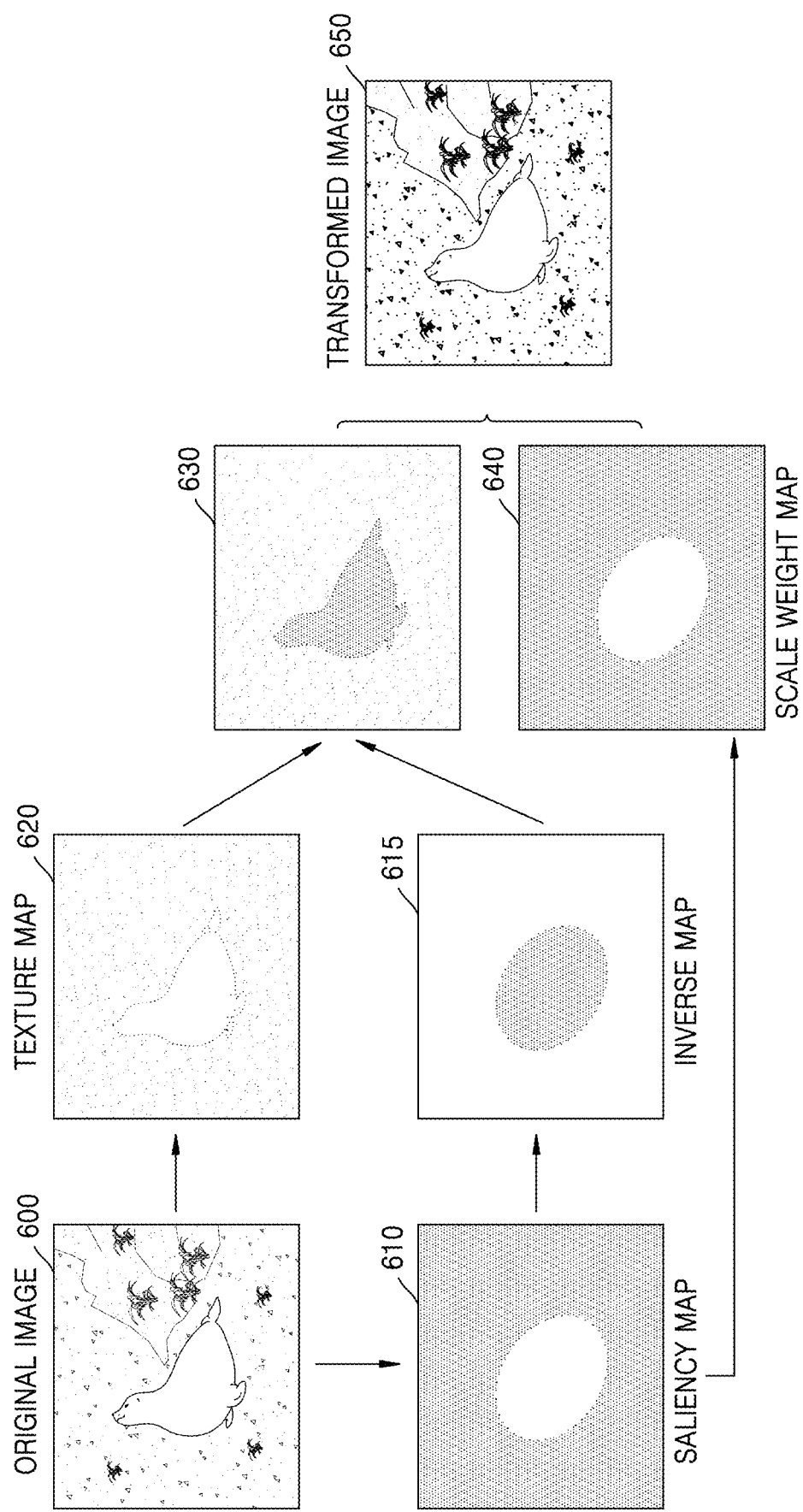

FIG. 8A

Input: $I(m, n)$, $g(m, n)$, and $S(m)$
Output: $T(m', n)$ $I(m, n)$: Input source image
$g(m, n)$: Salience guidance map
$S(m)$: Scaling function (derived from saliency map by projecting horizontal direction)
$T(m', n)$: Target image ($m' > m$)
$W_{out}$: Target image width (larger than input width)

```
function TargetImage(I(m, n), g(m, n), S(m), Wout)
    for i = 1:Wout do
        if S(mj)>1 then
            T(mi, n) = (1+g(mj, n))·I(mj, n)
            S(mj) ← S(mj) − 1
        else
            T(mi, n) = S(mj)·(1+g(mj, n))I(mj, n) + (1 − S(mj))·(1+g(mj+1, n))·I(mj+1, n)
            S(mj+1) ← S(mj)+S(mj+1) − 1
            j ← j+1
        end
    end for
end function
```

FIG. 9A

```
Input: I(m, n), g(m, n), and S(m)
Output: T(m', n)

T(m', n): Target image (m' < m)
W_out: Target image width (larger than input width)

function TargetImage(I(m, n), g(m, n), S(m), W_out)
  for i = 1:W_out do
    temp_S = S(m_j)
      while temp_S < 1 then
        if temp_S + S(m_{j+1}) > 1 then
          T(m_i, n) ← T(m_i, n) + (1 − temp_S)·(1+g(m_{j+1}, n))·I(m_{j+1}, n)
          S(m_{j+1}) ← temp_S + S(m_{j+1}) − 1
          break
        else
          T(m_i, n) ← T(m_i, n) + S(m_j)·(1+g(m_j, n))·I(m_j, n)
          temp_S ← temp_S + S(m_{j+1})
          j ← j+1
      end
  end for
end for
end function
```

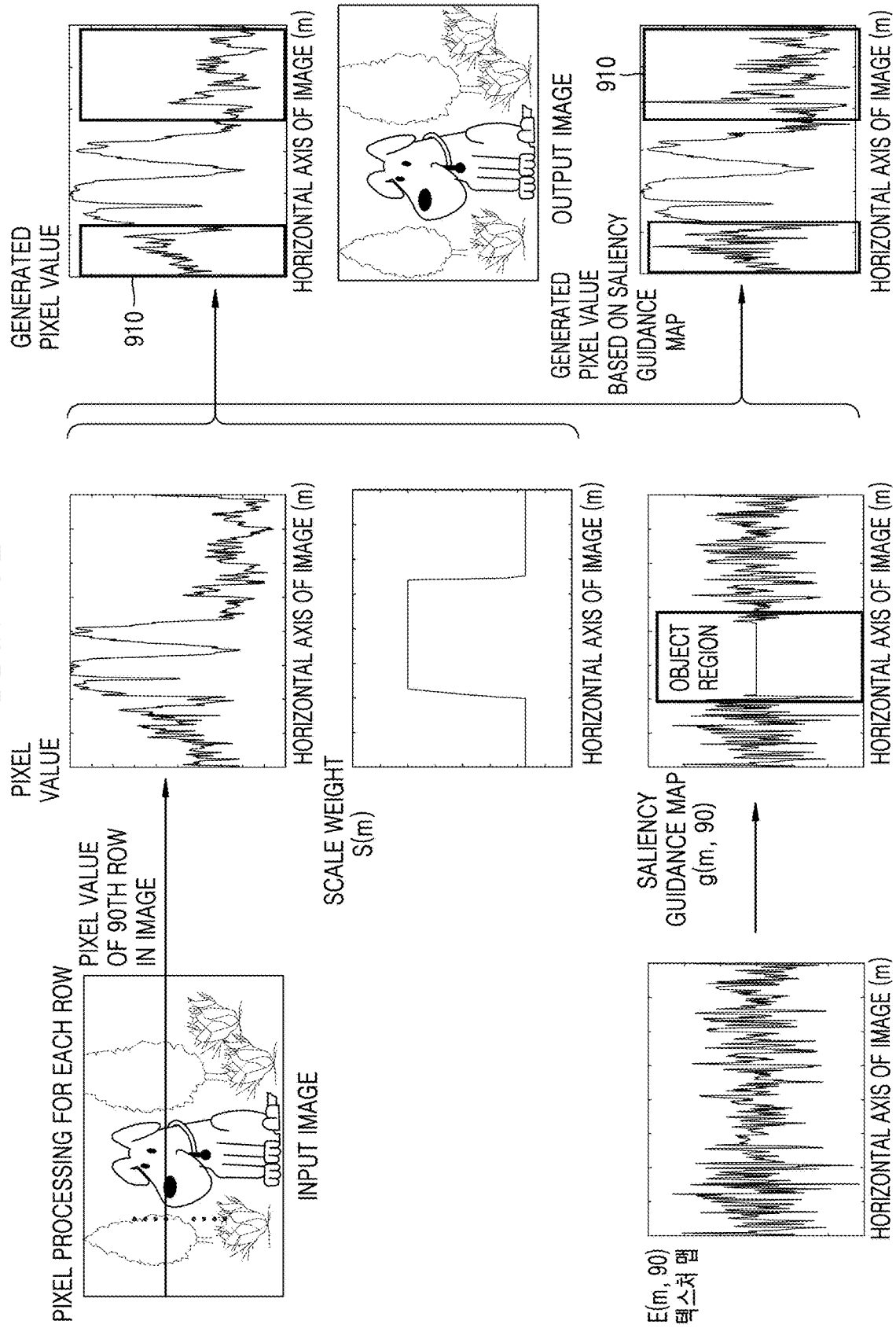

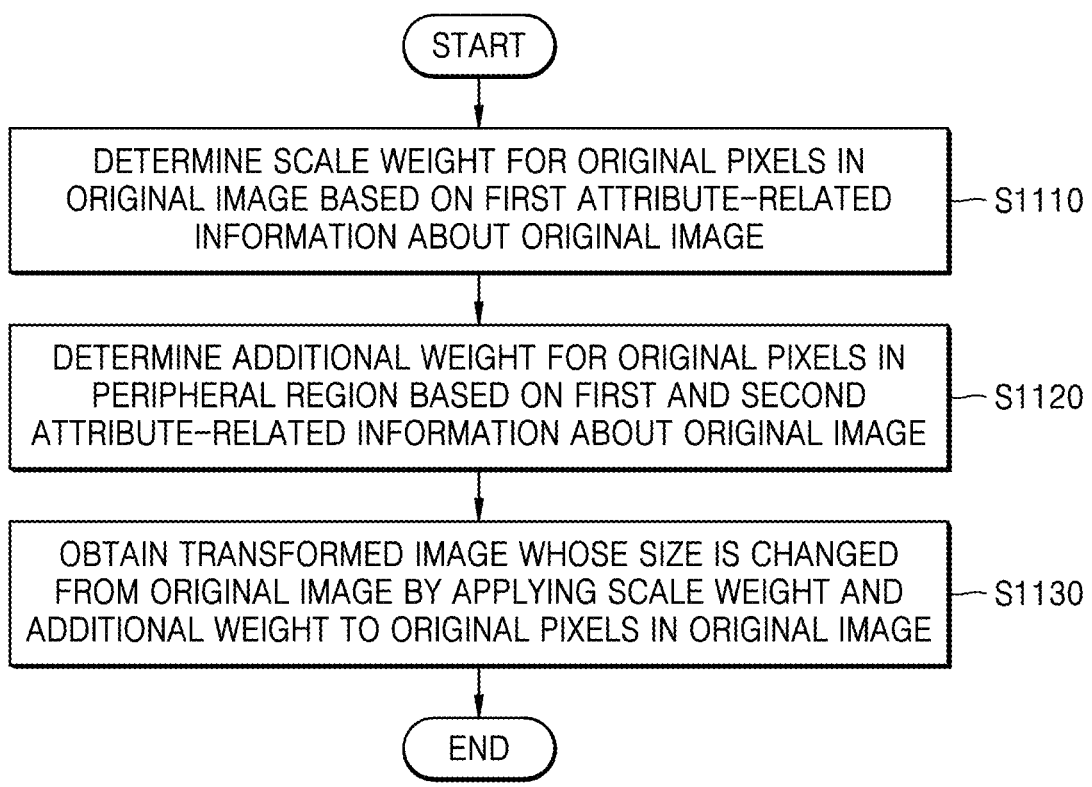

IMAGE PROCESSING APPARATUS FOR WEIGHT-BASED IMAGE TRANSFORMATION AND OPERATING METHOD THEREOF

CROSS-REFERENCE TO THE RELATED APPLICATION(S)

This application is a bypass continuation application of International Application No. PCT/KR2022/007304, filed on May 23, 2022, in the Korean Intellectual Property Receiving Office and claiming priority to Korean Patent Application No. 10-2021-0066492, filed May 24, 2021, the disclosures of which are incorporated by reference herein in their entireties.

BACKGROUND

1. Field

Various embodiments of the disclosure relate to an image processing apparatus, in which the size of an image is changed, and an operating method of the image processing apparatus, and more particularly, to an image processing apparatus that reduces distortion of a peripheral region of an image that occurs when the size of the peripheral region is selectively changed, and an operating method of the image processing apparatus.

2. Description of the Related Art

Recently, transmission of image information has become easier due to the development of Internet-of-Things (IoT) technology, and the image information may be output through various display apparatuses having various aspect ratios (or width-to-height ratios). In this case, when an aspect ratio of an original image and an aspect ratio of a display apparatus that outputs image information are changed, distortion may occur in an object region included in the image information, and accordingly, an unnatural image may be output.

For example, in order to match the aspect ratio of the display apparatus, when an image is changed by using a method (e.g., based on letterboxing) of inserting a black-and-white image into upper and lower regions or left and right regions of an original image or a method (e.g., based on linear scaling) of linearly expanding or reducing an original image, distortion may occur in the image.

Therefore, there is a need for a method of selectively retargeting an image according to saliency of an object or a background included in the image.

SUMMARY

Various embodiments of the disclosure may provide an image processing apparatus, capable of preserving an object region while reducing or preventing distortion of a peripheral region (e.g., a background part) by adaptively retargeting an original image based on attribute-related information about the original image when the size of the image is changed, and an operating method of the image processing apparatus.

According to an aspect of an example embodiment, provided is an image processing apparatus including: a memory configured to store one or more instructions; and a processor configured to execute the one or more instructions stored in the memory to: determine a scale weight for each pixel of original pixels in an original image based on first attribute-related information about the original image, the first attribute-related information being set by dividing the original image into an object region and a peripheral region; determine an additional weight for at least one pixel of the original pixels in the peripheral region, based on the first attribute-related information and second attribute-related information about the original image, the second attribute-related information being based on an amount of a change between pixel values of adjacent pixels; and obtain a transformed image of which a size is changed from the original image, by applying at least one of the scale weight and the additional weight to corresponding pixels of the original pixels in the original image to obtain a pixel value of a transformed pixel in the transformed image.

The processor may be further configured to execute the one or more instructions to, based on the scale weight and the additional weight being applied to the corresponding pixels of the original pixels in the original image, obtain a weighted sum of the corresponding pixels of the original pixels based on a weight in which the scale weight and the additional weight are reflected, and the pixel value of the transformed pixel in the transformed image may correspond to the weighted sum of the original pixels obtained based on the weight.

The processor may be further configured to execute the one or more instructions to: generate a first attribute-based map corresponding to the first attribute-related information about the original image; determine the scale weight for each pixel of the original pixels based on the first attribute-based map; generate a second attribute-based map corresponding to the second attribute-related information about the original image; and determine a guide map including the additional weight for the peripheral region based on the first attribute-based map and the second attribute-based map.

The first attribute-based map may include a saliency map for the original image or a depth map for the original image, and the second attribute-based map may include a texture map based on a change rate with respect to a difference value between pixel values of the original pixels.

The guide map may include a saliency guidance map in which an inverse map of the saliency map and the texture map are combined.

Based on the transformed image having a size greater than that of the original image, the scale weight obtained based on the first attribute-based map may be determined as a certain first value for the object region and determined as a value greater than the certain first value for the peripheral region, or based on the transformed image having a size less than that of the original image, the scale weight based on the first attribute-based map may be determined as a certain second value for the object region and determined as a value less than the certain second value for the peripheral region.

A density of the first attribute-based map may be obtained based on entropy, and change ratios in a vertical direction and a horizontal direction may be obtained based on the density, and based on the change ratios in the vertical direction and the horizontal direction, in the transformed image of which the size is changed from the original image, a height of the original image may be changed in the vertical direction and a width of the original image is changed in the horizontal direction.

In obtaining the transformed image of which the size is changed from the original image, both the scale weight and the additional weight, which has a value that is not zero, may be applied to the at least one pixel in the peripheral region of the original image.

According to an aspect of an example embodiment, provided is an image processing method including: determining a scale weight for each pixel of original pixels in an original image based on first attribute-related information about the original image, the first attribute-related information being set by dividing the original image into an object region and a peripheral region; determining an additional weight for at least one pixel of the original pixels in the peripheral region, based on the first attribute-related information and second attribute-related information about the original image, the second attribute-related information being based on an amount of a change between pixel values of adjacent pixels; and obtaining a transformed image of which a size is changed from the original image, by applying at least one of the scale weight and the additional weight to corresponding pixels of the original pixels in the original image to obtain a pixel value of a transformed pixel in the transformed image.

The obtaining of the transformed image may further include obtaining a weighted sum of the corresponding pixels of the original pixels based on a weight in which the scale weight and the additional weight are reflected, and the pixel value of the transformed pixel in the transformed image may correspond to the weighted sum of the corresponding pixels of the original pixels obtained based on the weight.

The determining of the scale weight may further include: generating a first attribute-based map corresponding to the first attribute-related information about the original image; and determining the scale weight for each pixel of the original pixels based on the first attribute-based map, and the determining of the additional weight may further include: generating a second attribute-based map corresponding to the second attribute-related information about the original image; and determining a guide map including the additional weight for the peripheral region based on the first attribute-based map and the second attribute-based map.

The guide map may include a saliency guidance map in which an inverse map of a saliency map and a texture map are combined.

Based on the transformed image having a size greater than that of the original image, the scale weight obtained based on the saliency map is determined as a certain first value for the object region and determined as a value greater than the certain first value for the peripheral region, or based on the transformed image having a size less than that of the original image, the scale weight based on the saliency map is determined as a certain second value for the object region and determined as a value less than the certain second value for the peripheral region.

A density of the first attribute-based map may be obtained based on entropy, and change ratios in a vertical direction and a horizontal direction may be obtained based on the density; and based on the change ratios in the vertical direction and the horizontal direction, in the transformed image of which the size is changed from the original image, a height of the original image may be changed in the vertical direction and a width of the original image is changed in the horizontal direction.

The obtaining of the transformed image may further include applying both the scale weight and the additional weight, which has a value that is not zero, to the at least one pixel in the peripheral region of the original image.

According to an aspect of an example embodiment, provided is a non-transitory computer-readable recording medium having recorded thereon a program which, when executed by at least one processor, causes the at least one processor to perform: determining a scale weight for each pixel of original pixels in an original image based on first attribute-related information about the original image, the first attribute-related information being set by dividing the original image into an object region and a peripheral region; determining an additional weight for at least one pixel of the original pixels in the peripheral region, based on the first attribute-related information and second attribute-related information about the original image, the second attribute-related information being based on an amount of a change between pixel values of adjacent pixels; and obtaining a transformed image of which a size is changed from the original image, by applying at least one of the scale weight and the additional weight to corresponding pixels of the original pixels in the original image to obtain a pixel value of a transformed pixel in the transformed image.

An image processing apparatus according to an embodiment of the disclosure may generate images having various aspect ratios without distorting a background or an object included in the images.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4A is a diagram for describing a process in which an image processing apparatus generates a transformed image whose size is changed by using a scale weight based on a saliency map, according to an embodiment of the disclosure;

FIG. 6 is a diagram for describing a process in which an image processing apparatus selectively adjusts an aspect ratio, according to an embodiment of the disclosure;

FIG. 8A illustrates a pseudocode in a horizontal upscale case, according to an embodiment of the disclosure;

FIG. 9A illustrates a pseudocode in a horizontal downscale case, according to an embodiment of the disclosure;

FIG. 9B is a diagram for describing a difference between a transformed pixel value generated based on an additional weight and a transformed pixel value generated without an additional weight according to the pseudocode in the horizontal downscale case of FIG. 9A;

FIG. 11 is a flowchart of an image processing method of an image processing apparatus, according to an embodiment of the disclosure.

DETAILED DESCRIPTION

Figure 1:
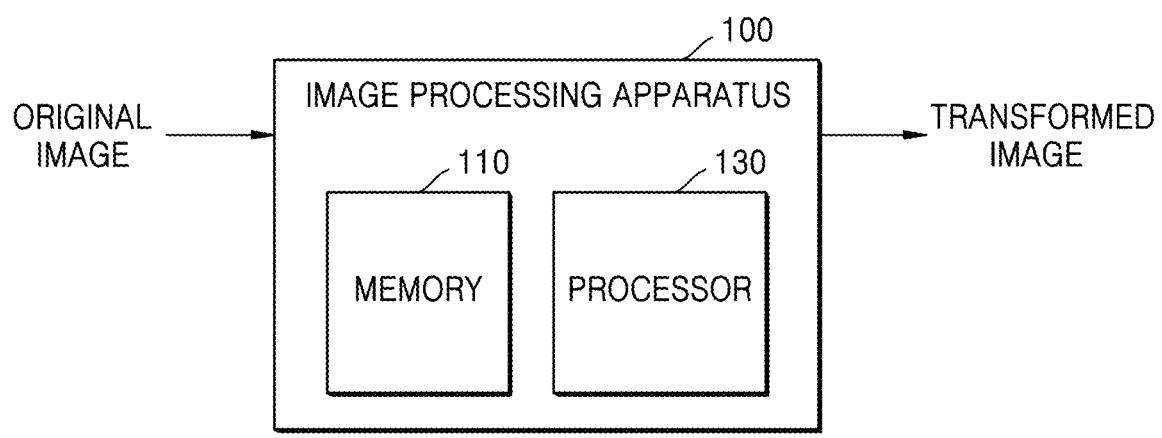
FIG. 1 is a diagram of a configuration of an image processing apparatus, according to an embodiment of the disclosure.

Hereinafter, one or more example embodiments of the present disclosure is described in detail with reference to the accompanying drawings.

Throughout the disclosure, the expression "at least one of a, b or c" indicates only a, only b, only c, both a and b, both a and c, both b and c, all of a, b, and c, or variations thereof.

Various modifications may be made in the disclosure and various embodiments may be implemented and thus certain embodiments are illustrated in the drawings and described in the detailed description. However, it should be understood that the scope of the disclosure is not limited to particular embodiments and all modifications, equivalents, and alternatives falling within the idea and scope of the disclosure are to be included in the scope of the disclosure.

In the following description of embodiments of the disclosure, the related art is not described in detail when it is determined that it may obscure the disclosure due to unnecessary detail. Numerals (e.g., first, second, etc.) used to describe embodiments of the disclosure are merely identification symbols for distinguishing one component from other components.

As used herein, when a component is referred to as being "connected" to another component, it should be understood that the component may be directly connected to the other component, but the component may be connected to the other component with another component therebetween, unless specified otherwise.

In addition, as used herein, for components expressed as the terms 'unit', '... er (... or)', 'module', etc., two or more components may be combined into one component, or one component may be divided into two or more components for each subdivided function. Each of the components to be described below may additionally perform some or all of the functions of other components in addition to main functions of each component, and some of the main functions of each of the components may be exclusively performed by other components.

A 'saliency map' used herein may refer to a map including a saliency value for distinguishing an object region and a peripheral region of an image. In this regard, the saliency map may represent the 'level of conspicuousness' in an image by pixel. Accordingly, when a user views an image, a region that the user mainly views or a region of interest may have a large pixel value in the saliency map. An image processing apparatus 100 may determine a scale factor (or scale weight) based on the saliency map. The image processing apparatus 100 may generate the saliency map by using a neural network, but is not limited thereto. For example, the saliency map may be generated (as a spectral saliency map) by using a Fourier transform.

A 'scale factor (or scale weight)' used herein is a weight applied to an original pixel of an original image to adjust the size of the image, and a pixel value of a scaled image (or a transformed image) may be determined based on the scale factor. One pixel value of the scaled image is determined as a weighted sum based on at least one original pixel value of an original image and a weight for the at least one original pixel. In this regard, a sum of weights corresponding to at least one original pixel used to calculate one pixel value of the scaled image needs to be a certain value (e.g., 1).

For example, the image processing apparatus 100 may determine a value obtained by adding pixel values having the same x-coordinates as a scale factor corresponding to the x-coordinates. Alternatively, the image processing apparatus 100 may determine a value such as an average value, a maximum value, or a minimum value of pixel values having the same x-coordinates in a saliency map as a scale factor corresponding to the x-coordinates. Accordingly, the scale factor may be expressed as a function having an x-coordinate of a pixel as an input variable. However, the scale factor is not limited thereto and may also be expressed as a function having a y-coordinate as an input variable.

Also, as used herein, a 'neural network' is an example of an artificial intelligence model simulating brain nerves, and is not limited to a neural network model using a specific algorithm.

Furthermore, a 'parameter' used therein is a value used in a calculation process of respective layers constituting a neural network, and may include, for example, a weight used when an input value is applied to a certain calculation expression. The parameter may be expressed in the form of a matrix. The parameter is a value set as a result of training and may be updated by using separate training data in an embodiment.

An 'object region' used herein is a region including an object of interest in an image and may refer to a region in which a saliency value (or depth value) is higher (or lower) than a certain threshold value. A 'peripheral region' is a region that is not an object of interest in an image, for example, a region including a part such as a background, and may refer to a region in which a saliency value (or depth value) is lower (or higher) than a certain threshold value. However, the peripheral region is not limited to being based on the certain threshold value, and an image may be divided into the 'object region' and the 'peripheral region' by various techniques.

An 'original image' used herein may refer to an image (input image) that is input to the image processing apparatus 100 and is an object to be image-processed.

A 'transformed image' used herein may refer to an image (output image) generated by performing image processing on an original image by the image processing apparatus 100, and may refer to an image whose size is changed from the original image. When the size of the original image is changed, the size of the object region is maintained as much as possible, but the size of the peripheral region may be changed. Distortion may occur in the peripheral region due to the change in the size of the peripheral region. In this regard, the image quality of the peripheral region may be improved through image processing on the peripheral region. In detail, the image quality may be improved by increasing the sharpness of a texture edge of the peripheral region, based on information related to an attribute that does not change from the original image (e.g., a texture map based on an edge gradient).

Also, as used herein, a "texture map" is a map representing a change rate of a texture edge in an image, and may be derived, for example, based on a quadratic differential with respect to various directions of a pixel in an original image. The "texture map" may be used as a weight to increase the sharpness of the texture edge. For example, when a change amount (e.g., a secondary change amount) with respect to a difference value between pixel values of the original image (e.g., a primary change amount) has a positive value, a positive additional weight is applied to the pixel value, and when the change amount has a negative value, a negative additional weight is applied to the pixel value, so that a difference value between pixels may be increased, thereby increasing the sharpness of the texture edge.

Also, an 'Image' used herein may be a still image or a video itself. For example, the 'Image' may include a still image constituting a video.

Also, as used herein, a 'sample' is a data assigned to a sampling position of an original image or an original image attribute-related information (map), and may refer to data that is an object to be processed. For example, pixels in a frame in a spatial domain and transform coefficients in a transform domain may be samples. Accordingly, a pixel value in the frame in the spatial domain may be a sample value. A unit including at least one sample described above may be defined as a block.

Hereinafter, embodiments of the disclosure will be described in detail in order.

FIG. 1 is a diagram of a configuration of an image processing apparatus 100, according to an embodiment of the disclosure.

The image processing apparatus 100 may include a memory 110 and a processor 130. The image processing apparatus 100 may be implemented as a device capable of image processing, such as a server, a television (TV), a camera, a mobile phone, a tablet personal computer (PC), a laptop computer, etc.

In FIG. 1, the memory 110 and the processor 130 are separately illustrated, but the memory 110 and the processor 130 may be implemented through one hardware module (e.g., a chip).

The processor 130 may be implemented as a dedicated processor for neural network-based image processing. Alternatively, the processor 130 may be implemented through a combination of software and a general-purpose processor such as an application processor (AP), a central processing unit (CPU), or a graphics processing unit (GPU). The dedicated processor may include a memory for implementing the embodiments of the disclosure or a memory processor for using an external memory.

The processor 130 may include a plurality of processors. In this case, the plurality of processors may be implemented as a combination of dedicated processors, or may also be implemented through a combination of software and a plurality of general-purpose processors such as an AP, a CPU, or a GPU.

The memory 110 may store one or more instructions for image processing. In an embodiment of the disclosure, the memory 110 may store a neural network used to generate a saliency map. When the neural network is implemented in the form of a dedicated processor for artificial intelligence or implemented as part of an existing general-purpose processor (e.g., a CPU or an AP) or dedicated graphics processor (e.g., a GPU), the neural network may not be stored in the memory 110. The neural network may be implemented by an external apparatus (e.g., a server), and in this case, the image processing apparatus 100 may request generation of the saliency map from the external apparatus and receive the saliency map from the external apparatus.

The processor 130 may obtain reconstructed consecutive frames by sequentially processing consecutive frames according to the instructions stored in the memory 110. The consecutive frames may refer to frames constituting a video. However, in the disclosure, the consecutive frames do not necessarily constitute a video. In other words, still images captured separately from each other may be processed by the image processing apparatus 100 according to a predetermined order, an arbitrary order, or an order set by a user.

As illustrated in FIG. 1, the image processing apparatus 100 may output a transformed image in which the size of the image is changed through image processing (e.g., filter processing) on the original image. In this regard, image quality improvement may be performed on the peripheral region in the image together with the change in the size of the image.

The image processing apparatus 100 may generate first attribute-related information about the original image including the object region and the peripheral region. The first attribute-related information may include information by which the object region and the peripheral region of the original image are distinguished from each other. The first attribute-related information may include a first attribute-based map corresponding to the first attribute-related information about the original image. For example, the first attribute-based map may include a saliency map for the original image or a depth map for the original image. In order to change the size of the original image, the image processing apparatus 100 may determine a scale weight (of a filter) for original pixels of the original image based on the first attribute-related information. In this regard, the size of an image to be changed is determined first, and the scale weight for the original pixel may be determined based on the size of the image to be changed and the first attribute-related information.

The image processing apparatus 100 may determine an additional weight for the original pixels in the original image of the peripheral region for improving the image quality of the peripheral region based on the first attribute-related information and second attribute-related information about the original image.

For example, the image processing apparatus 100 may generate a second attribute-based map corresponding to the second attribute-related information about the original image. In this case, the second attribute-based map for the original image may be information based on a change amount between pixel values of adjacent pixels. The second attribute-based map may include a texture map. The texture map may be a map based on a rate of change (e.g., a secondary change rate) with respect to a difference value between pixel values of the original image (e.g., a primary change rate). The image processing apparatus 100 may generate a guide map based on the first attribute-based map and the second attribute-based map. In this regard, the guide map may include an additional weight.

For example, the guide map may be a map generated based on the saliency map and the texture map. In detail, the guide map may be a saliency guidance map in which an inverse map of the saliency map and the texture map are combined. An additional weight included in the saliency guidance map may be 0 or close to 0 (which may be within a certain range near 0) in the object region, and may have a value between −1 and 1 (a value that is not 0 or not close to 0, that is, a value not within a certain range near 0) in the peripheral region. Generating a texture map and a saliency guidance map will be described below with reference to FIGS. 7A and 7B.

The image processing apparatus 100 may obtain a transformed image whose size is changed from the original image, by applying the scale weight and the additional weight to the original pixels of the original image. Applying the scale weight and the additional weight to the original pixels of the original image may correspond to performing filter processing on the original image by using a filter. In this regard, the filter may include a scale weight and an additional weight.

In an example, one scale weight or a sum of a plurality of scale weights used to calculate a pixel value of one transformed pixel among transformed pixels in the transformed image may be a certain value (e.g., 1). In this regard, the original pixel and a corresponding scale weight may have a 1:1 correspondence. Accordingly, respective scale weights corresponding to a plurality of original pixels may be determined.

The image processing apparatus 100 may calculate a weighted sum of pixels included in the original image based on the scale weight and the additional weight, when the scale weight and the additional weight are applied to the pixels of the original image. In this regard, pixel values of the transformed pixels of the transformed image may correspond to a weighted sum of the pixels included in the original image. In detail, a process in which the image processing apparatus 100 applies a filter to pixels of an original image will be described below with reference to FIGS. 8A to 9B.

When a transformed image whose size is changed from the original image is obtained by applying the scale weight and the additional weight to the original pixels, the image processing apparatus 100 may obtain a first difference value between the pixel values of the transformed pixels of the transformed image to be greater than a second difference value between pixel values of transformed pixels included in the peripheral region determined based on the scale weight of the filter rather than the additional weight of the filter (e.g., based only on the scale weight). That is, the image quality of the peripheral region may be improved by making a part such as a texture edge of the peripheral region sharper. Obtaining the first difference value to be greater than the second difference value will be described below with reference to FIG. 8B or 9B.

In an example, the image processing apparatus 100 may determine, based on the saliency map, a scale weight for the object region as a first weight having a certain value and determine the value of a scale weight for the peripheral region as a value greater than the value of the first weight. In this regard, the certain value of the first weight may be 1, but is not limited thereto. In this case, the transformed image obtained based on the scale weight may be an image whose size is greater than that of the original image.

In another example, the image processing apparatus 100 may determine, based on the first attribute-based map (e.g., a saliency map or a depth map), a scale weight for the object region as a first weight having a certain value and determine a scale weight for the peripheral region as a value less than the first attribute-based map having the certain value. In this regard, the certain value may be 1, but is not limited thereto.

In this case, the transformed image obtained based on the scale weight may be an image whose size is less than that of the original image.

In consideration of the object region and the peripheral region of the original image, in the transformed image whose size is changed from the original image, as a height of the original image is changed in a vertical direction, a width of the original image may be changed in a horizontal direction. That is, in consideration of the object region and the peripheral region of the original image, the size of the original image may be changed in both the vertical direction and the horizontal direction. In this regard, a change ratio in the vertical direction and a change ratio in the horizontal direction may be determined in consideration of the object region and the peripheral region of the original image.

In detail, the image processing apparatus 100 may calculate a density of the first attribute-based map based on entropy and may calculate the change ratios in the vertical and horizontal directions based on the density. A height and a width of the original image to be changed may be calculated based on the change ratios in the vertical and horizontal directions, and the scale weight may be determined based on the height and the width of the original image to be changed. In this regard, the scale weight may be determined based on the saliency map (or depth map). Changing the size of an original image in both directions based on entropy will be described below with reference to FIGS. 5A to 5C.

Though not illustrated in FIG. 1, the image processing apparatus 100 may further include a display or may be connected to a separate display apparatus. The image generated by the image processing apparatus 100 may be reproduced on the display or the display apparatus. In an embodiment, the image generated by the image processing apparatus 100 may be post-processed and then reproduced on the display or the display apparatus.

According to an implementation, the image processing apparatus 100 may encode the image through an image compression method using transformation. An image compression method using frequency transformation may include processes of generating prediction data by predicting a reconstructed frame, generating residual data corresponding to a difference between the reconstructed frame and the prediction data, transforming the residual data, which is a spatial domain component, into a transform domain component, quantizing the residual data transformed into the transform domain component, and performing entropy encoding on the quantized residual data. The image compression method as described above may be implemented through any of image compression methods using a transform, such as Moving Pictures Exports Group-2 (MPEG-2), H.264 Advanced Video Coding (AVC), MPEG-4, High Efficiency Video Coding (HEVC), VC-1, VP8, VP9, and AOMedia Video 1 (AV1).

Encoded data generated through encoding of a reconstructed image may be transferred to an external device through a network or may be stored in data storage media, such as magnetic media such as a hard disk, a floppy disk, and a magnetic tape, optical recording media such as a compact disc read-only memory (CD-ROM) and a digital versatile disc (DVD), magneto-optical media such as a floptical disk, etc.

Figure 2:
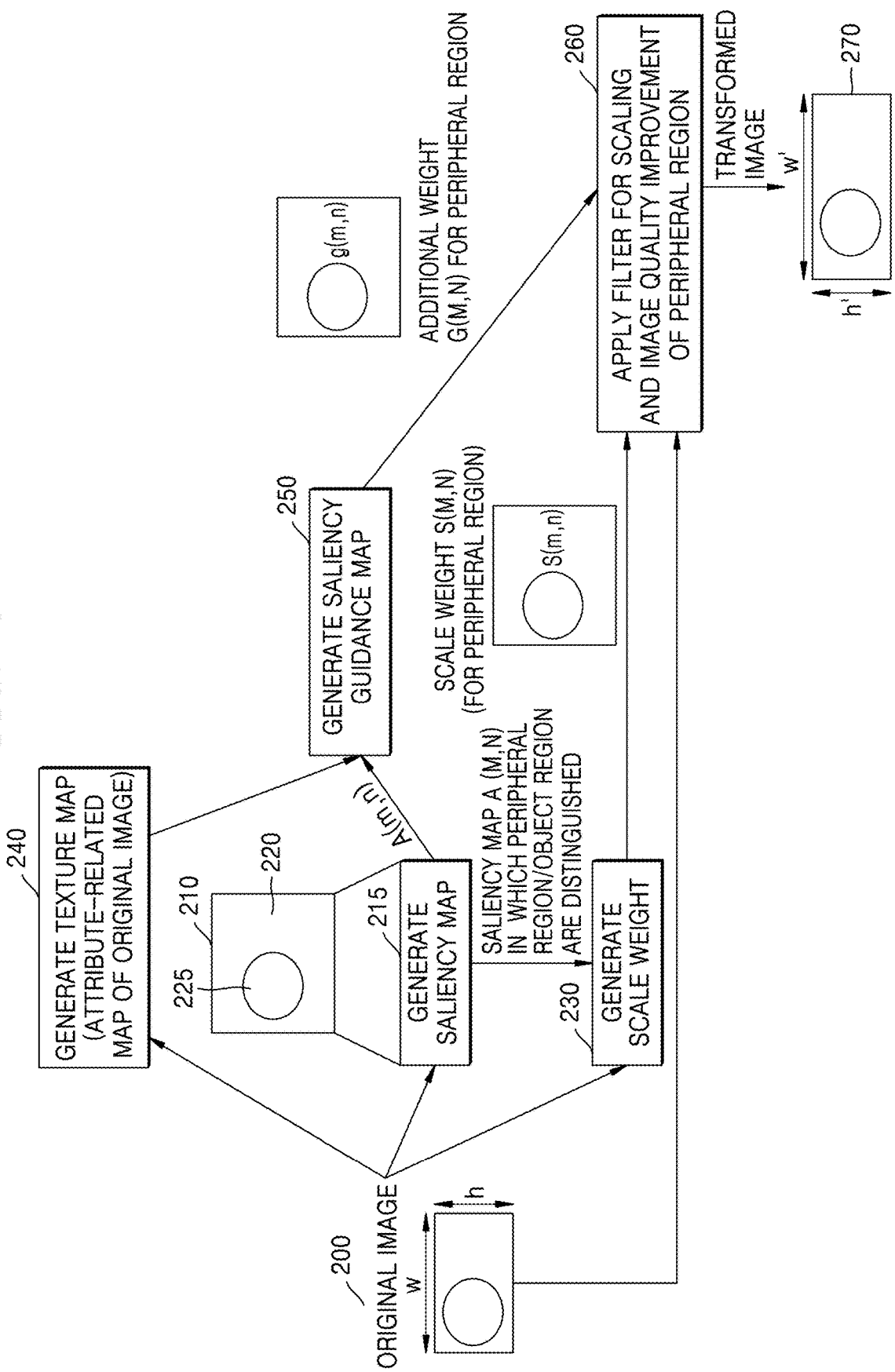
FIG. 2 is a diagram for describing in detail a process of processing an original image by an image processing apparatus.

Hereinafter, a process in which the image processing apparatus 100 processes an original image will be described in detail with reference to FIG. 2.

The image processing apparatus 100 may generate a saliency map 210 by using an original image 200 as an input (operation 215). The saliency map 210 is a map in which a peripheral region 220 and an object region 225 are distinguished from each other, and the image processing apparatus 100 may adaptively determine a scale weight for each region based on the saliency map 210 (operation 230). Scaling may be performed on the peripheral region 220 based on a scale weight for the peripheral region 220. In an example, a scale weight for the object region 225 may be set to 1, and accordingly, the object region 225 may not be scaled. However, the disclosure is not limited thereto, and a weight for the object region 225 may be determined as a value other than 1 based on the saliency map 210.

In order to minimize distortion of the peripheral region 220 caused by adaptively determining the scale weight, the image processing apparatus 100 may generate an attribute-related map of the original image 200 (operation 240) and generate a saliency guidance map based on the attribute-related map of the original image 200 and the saliency map 210 (operation 250). In this regard, the saliency guidance map may have an additional weight for the peripheral region 220 and no additional weight for the object region 225, based on an attribute of the original image 200. Accordingly, the image quality of the peripheral region 220 may be improved based on the additional weight for the peripheral region 220. For example, the attribute-related map of the original image 200 may be a texture map, but is not limited thereto.

The image processing apparatus 100 may apply, to the original image 200, a filter including a scale weight $S(m,n)$ and an additional weight $g(m,n)$ for the peripheral region 220, and may thus perform scaling and image quality improvement on the peripheral region 220 (operation 260). That is, a transformed image 270 may be an image whose size is changed from the original image 200, and as described above, due to the additional weight for the peripheral region 220, the image quality of the peripheral region 220 may be improved.

Although it is described above that scaling and image quality improvement are performed on the peripheral region 220 only, the disclosure is not limited thereto, and filter processing may be performed on the object region 225 similarly to the filter processing on the peripheral region 220. In an example, the scale weight and the additional weight for the object region 225 may be determined to be less than those of the peripheral region 220.

For example, a corrected additional weight may be determined by multiplying the additional weight by a correction coefficient (a value between 0 and 1). The correction coefficient may be determined based on the scale weight.

Figure 3:
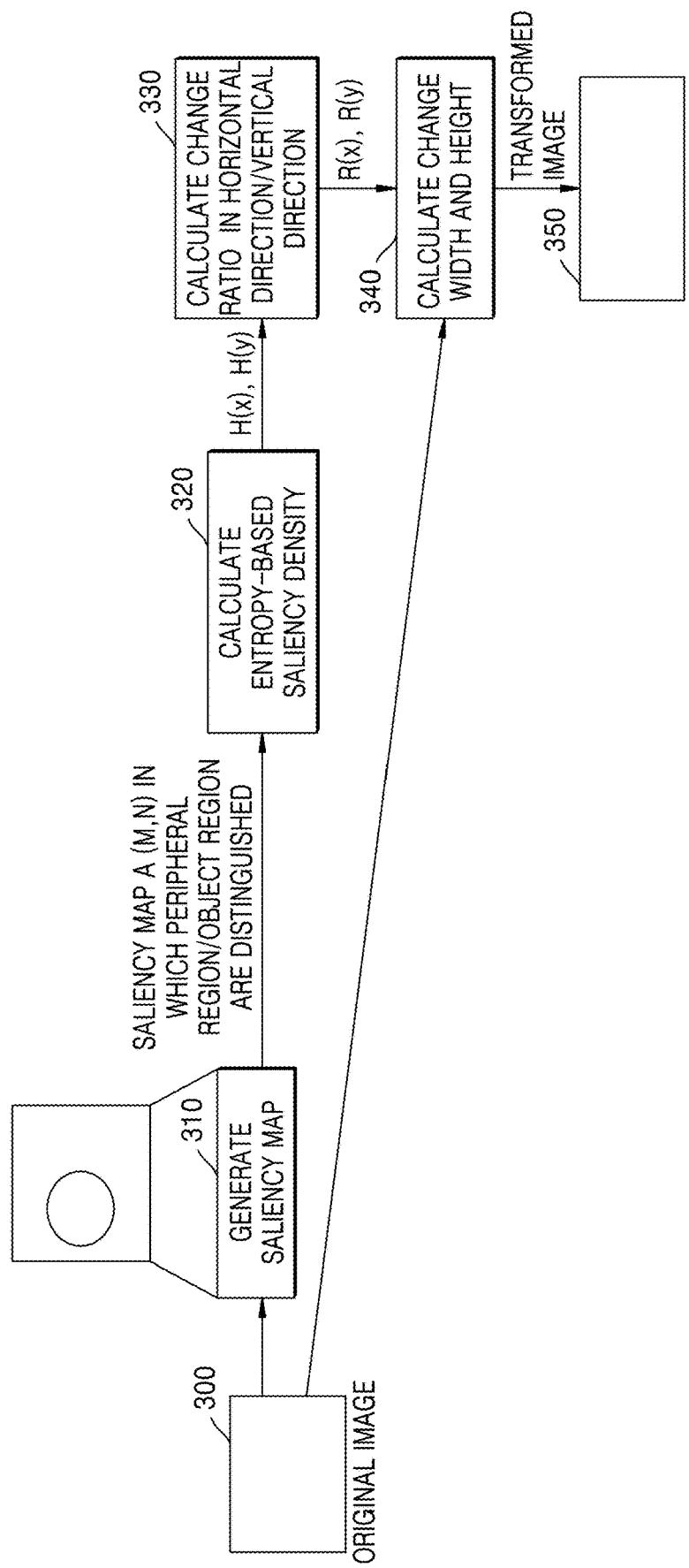
FIG. 3 is a diagram for describing in detail a process in which an image processing apparatus scales an original image in both directions in consideration of an entropy-based saliency density.

Hereinafter, a process in which the image processing apparatus 100 scales an original image in both directions in consideration of an entropy-based saliency density will be described in detail with reference to FIG. 3.

The image processing apparatus 100 may generate a saliency map in which a peripheral region and an object region are distinguished from each other (operation 310). The image processing apparatus 100 may calculate an entropy-based saliency density based on a saliency value of a saliency map $A(m,n)$ (operation 320). Entropy-based saliency densities $H(x)$ and $H(y)$ may be calculated in a horizontal direction and a vertical direction, respectively.

The image processing apparatus 100 may calculate change ratios $R(x)$ and $R(y)$ in the horizontal direction and the vertical direction based on the entropy-based saliency densities $H(x)$ and $H(y)$, respectively (operation 330). That is, the image processing apparatus 100 may identify, based on the entropy-based saliency densities $H(x)$ and $H(y)$, which direction includes more peripheral regions compared to a salient object region, identify whether scaling in the horizontal direction is free or scaling in the vertical direction is free, and calculate a change ratio in a freer direction, to be higher. In this case, free scaling refers to a larger range of a scalable scale region. Accordingly, when scaling is performed in a freer direction, the range of the scalable scale region is large, and thus, the change ratio may be determined to be greater.

The image processing apparatus 100 may calculate a change height (a height the original image is to change into) and a change width (a width the original image is to change into) based on the change ratio (operation 340), determine a scale weight based on the saliency map, the change height, and the change width, and obtain a transformed image whose size is changed from the original image based on the scale weight (operation 350). Because scaling is performed in both directions, compared to when scaling is performed in one direction, adjustment in various directions may be performed, and a change ratio in each direction may be determined based on the saliency map, thereby minimizing distortion of the object region.

A more detailed process in which the image processing apparatus 100 scales an original image in both directions in consideration of an entropy-based saliency density will be described later with reference to FIGS. 5A to 5C.

FIG. 4A is a diagram for describing a process in which an image processing apparatus generates a transformed image whose size is changed by using a scale weight based on a saliency map, according to an embodiment of the disclosure.

Referring to FIG. 4A, the image processing apparatus 100 may adjust an aspect ratio through selective resizing by using an original image 410 as an input, and may output a transformed image 440. In this regard, a scale weight 430 may be generated based on a saliency map 420. The saliency map 420 may be set in a manner such that an object region and a peripheral region are divided, and accordingly, the scale weight 430 generated based on the saliency map 420 may also be set in a manner such that an object region 450 and a peripheral region 460 are divided. However, the disclosure is not limited thereto. The object region and the peripheral region may not be set to be clearly divided in the saliency map 420, and a saliency value may have a continuous value, but the image processing apparatus 100 may divide an original image into an object region and a peripheral region based on the saliency map 420 through various techniques. This may also apply to the scale weight 430 or a depth map that may replace the saliency map.

In this regard, the scale weight 430 for the object region 450 may be 1 or a value within a certain range including 1, and accordingly, scaling may not be performed at all or may be only slightly performed on the object region 450, and the object region 450 may be preserved even in the transformed image 440. Moreover, the scale weight 430 for the peripheral region 460 may be a value greater than 1 or a value outside a certain range including 1. Alternatively, the object region 450 and the peripheral region 460 may be separately set based on whether a gradient of a saliency value of a peripheral pixel or a gradient (or, for example, an absolute value of a gradient) of the scale weight 430 is greater than or equal to a certain value. In this regard, the gradient is not limited to a primary gradient and may be secondary gradient, where the scale weight 430 at a boundary between the object region 450 and the peripheral region 460 may be a value greater than 1. The disclosure is not limited thereto, and the scale weight 430 may be refined to have a certain value (e.g., 1) with respect to the object region 450.

Upscaling may be performed on the peripheral region 460, and the size of the peripheral region 460 may be changed. That is, the image processing apparatus 100 adjusts an aspect ratio through selective resizing based on the saliency map, so that a part (e.g., object region) that a user pays more attention may be preserved, and even if distortion may occurs in a peripheral region by resizing a remaining part (e.g., peripheral region) that is not paid much attention, the user may not feel deterioration in image quality caused by the distortion.

With reference to FIG. 4A, it has been described that the image processing apparatus 100 performs selective resizing by using the saliency map 420, but the disclosure is not limited thereto. Various pieces of attribute map information in which the object region 450 and the peripheral region 460 are separately set may be used. For example, a depth map for the original image 410 may be used.

Also, with reference to FIG. 4A, it has been described for convenience of description that the image processing apparatus 100 performs upscaling in a horizontal direction, but the disclosure is not limited thereto, and upscaling may be performed in a vertical direction. Also, it has been described that the image processing apparatus 100 performs upscaling, but the disclosure is not limited thereto, and downscaling may be performed. In this regard, a weight of the peripheral region 460 may be less than 1.

Figure 4B:
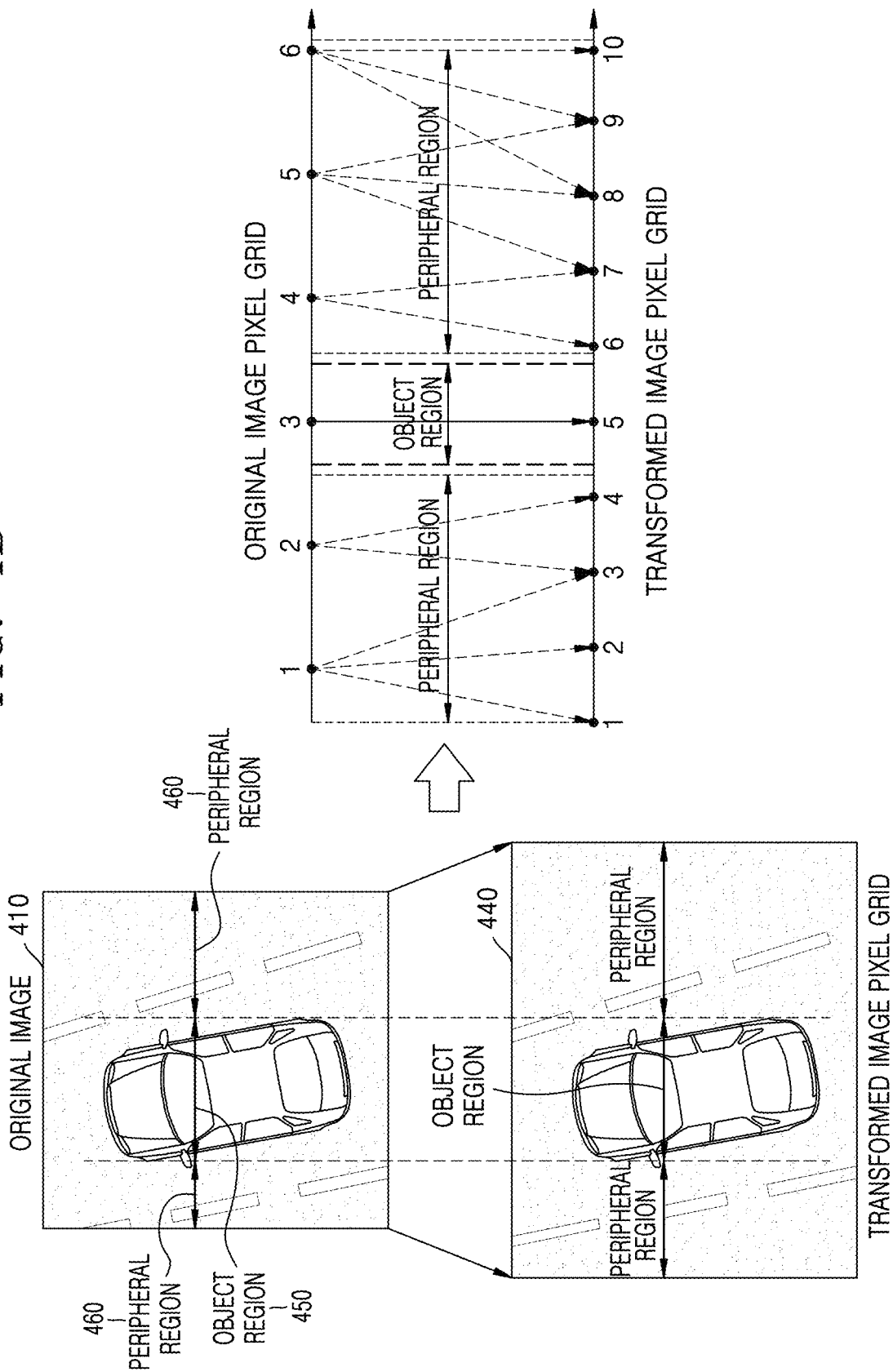
FIG. 4B is a diagram for describing a process in which a pixel grid is expanded when an image processing apparatus performs resizing, according to an embodiment of the disclosure.

FIG. 4B is a diagram for describing a process in which a pixel grid is expanded when an image processing apparatus performs resizing, according to an embodiment of the disclosure.

Referring to FIG. 4B, when the image processing apparatus 100 performs selective resizing an original image 410 by using a saliency map, the image processing apparatus 100 may not expand an original image pixel grid of the object region 450 in the original image 410. That is, as coordinates of an original pixel and a transformed pixel are mapped in a one-to-one relationship, the object region 450 may be preserved.

On the other hand, the image processing apparatus 100 may expand an original image pixel grid of the peripheral region 460 in the original image 410. That is, as coordinates of an original pixel and a transformed pixel are mapped in a one-to-many relationship, the peripheral region 460 is not preserved but may be expanded. When the coordinates are mapped to the transformed pixel in a one-to-many relationship, a pixel value of one transformed pixel in the transformed image 440 may be expressed as a weighted sum of pixel values of at least one original pixel. In this regard, the weight may be the scale weight 430 and the additional weight.

With reference to FIG. 4B, it has been described that the image processing apparatus 100 performs upscaling, but the disclosure is not limited thereto, and downscaling may be performed. In this regard, a weight of the peripheral region 460 may be less than 1, and accordingly, a pixel grid may be reduced and coordinates of an original pixel and a transformed pixel are mapped many-to-one, so that the peripheral region 460 is not preserved but may be reduced.

When the coordinates are mapped many-to-one, a pixel value of one transformed pixel may be expressed as a weighted sum of pixel values of a plurality of original pixels.

Figure 4C:
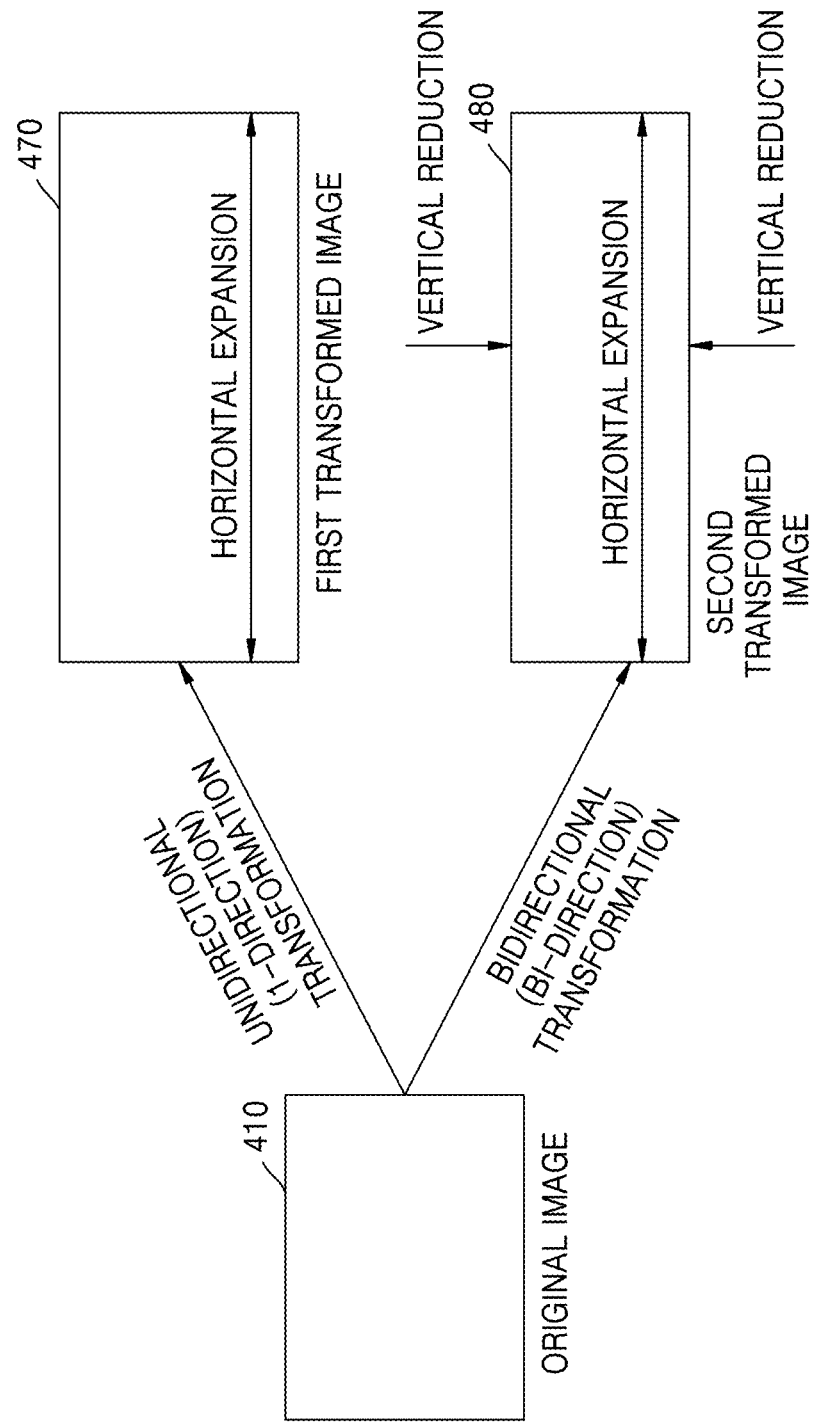
FIG. 4C is a diagram for describing unidirectional transformation and bidirectional transformation, according to an embodiment of the disclosure.

FIG. 4C is a diagram for describing unidirectional (1-direction) transformation and bidirectional (bi-direction) transformation, according to an embodiment of the disclosure.

The image processing apparatus 100 may perform unidirectional transformation in a horizontal direction or a vertical direction by using a saliency map. For example, referring to FIG. 4C, in order to adjust an image ratio to a certain ratio, the image processing apparatus 100 may obtain a first transformed image 470 having a width greater than that of the original image 410 by horizontally expanding the original image 410 by using the saliency map. When unidirectional transformation is performed, distortion may occur in the image due to limitation of transformation in only one direction.

Accordingly, the image processing apparatus 100 is not limited to the unidirectional transformation and may perform bidirectional transformation. That is, in order to adjust the image ratio to a certain ratio, the image processing apparatus 100 may obtain a second transformed image 480 having a width greater than and a height less than those of the original image 410, by not only horizontally expanding the original image 410 but also vertically reducing the original image 410 by using the saliency map. When bidirectional transformation is performed, distortion in the image may be reduced or avoided compared to the unidirectional transformation.

Figure 5A:
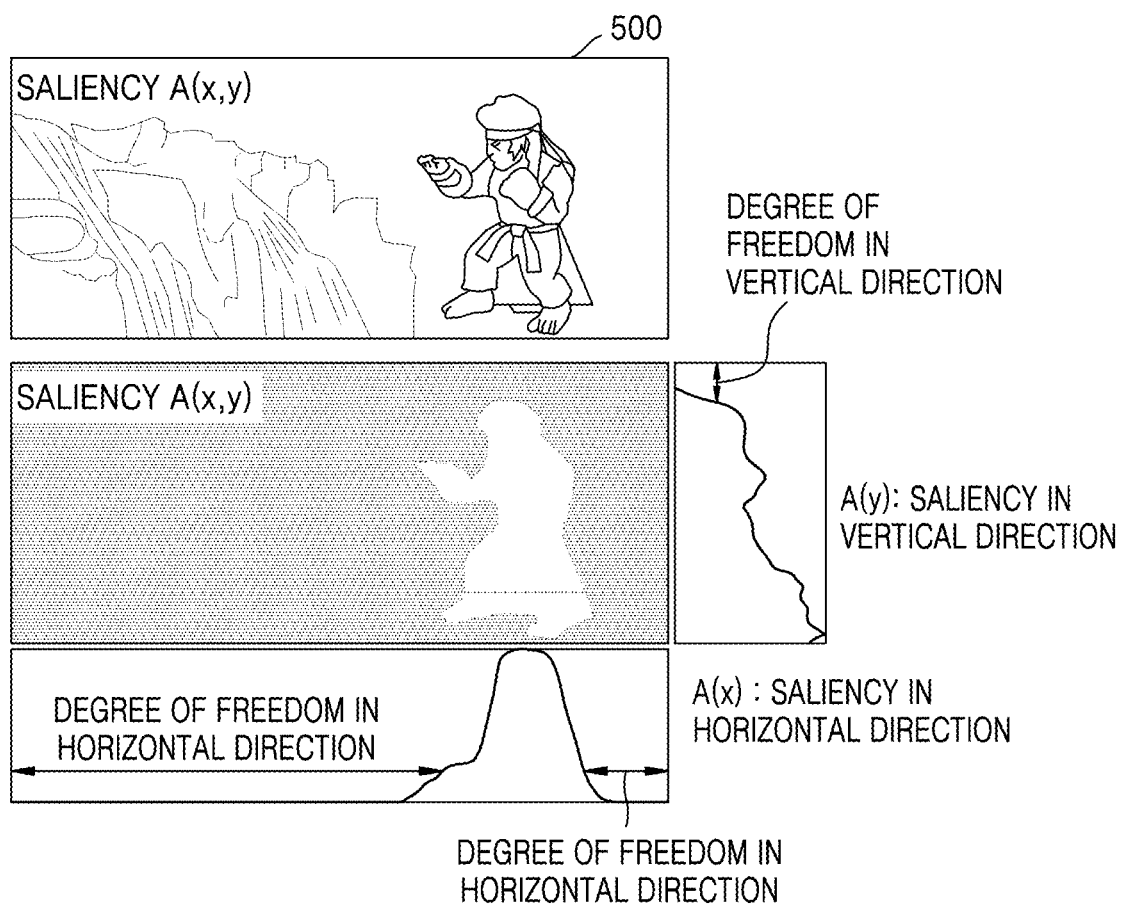
FIG. 5A is a diagram for describing a process in which an image processing apparatus adjusts an image ratio through entropy-based saliency density analysis, according to an embodiment of the disclosure.

FIG. 5A is a diagram for describing a process in which an image processing apparatus adjusts an image ratio through entropy-based saliency density analysis, according to an embodiment of the disclosure.

The image processing apparatus 100 may determine saliencies A(x,y) for an original image 500 based on the original image 500. The image processing apparatus 100 may determine, based on the saliencies A(x,y), a saliency A(x) in a horizontal direction and a saliency A(y) in a vertical direction. For example, A(x) may be an average value of values of A(x) (x is a value between '0' and Image width −1') and A(y) may be an average value of values of A(y) (y is a value between '0' and Image height −1'), but is not limited thereto and may be any value.

The image processing apparatus 100 may determine an adjustment ratio $R_{hor}$ in a horizontal direction and an adjustment ratio $R_{ver}$ in a vertical direction, based on the saliency A(x) in the horizontal direction and the saliency A(y), according to the following equation.

$$R_{hor} = \frac{H(A(y))}{H(A(x)) + H(A(y))},$$ [Equation 1]

$$R_{ver} = \frac{H(A(x))}{H(A(x)) + H(A(y))},$$

$$H(x) = -\sum_i P(x_i) \log P(x_i)$$

where H( ) may denote signal entropy. As for an entropy value H, a higher value may be derived as the distribution of values is wider, and a lower value may be derived as the distribution of the values is narrower. For example, as for H(A(x)), a higher value may be derived as a saliency $A(x_i)$ is widely distributed, and a lower value may be derived as the saliency $A(x_i)$ is narrowly distributed.

For example, referring to FIG. 5A, the distribution of A(x) may be narrowly distributed, and the distribution of A(y) may be widely distributed. In this case, the degree of freedom in a vertical direction may be small and the degree of freedom in a horizontal direction may be high. The image processing apparatus 100 may set an adjustment ratio in a direction with a high degree of freedom, to be higher.

Accordingly, the image processing apparatus 100 may adjust (or transform) the image ratio in both directions through the entropy-based saliency density analysis in order to minimize image distortion.

Figure 5B:
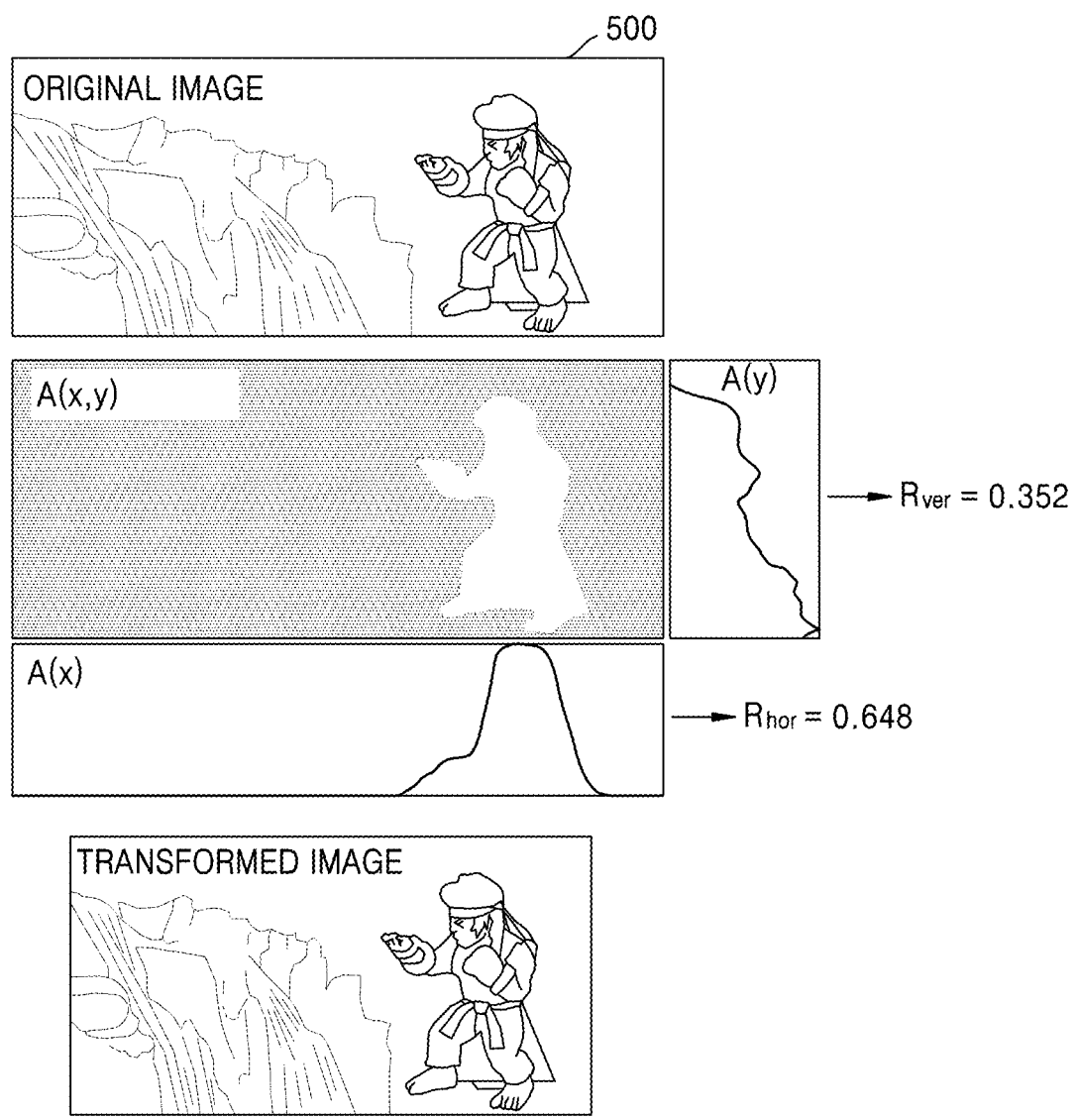
FIGS. 5B and 5C are diagrams for describing a detailed process in which an image processing apparatus adjusts an image ratio through entropy-based saliency density analysis, according to an embodiment of the disclosure.
Figure 5C:
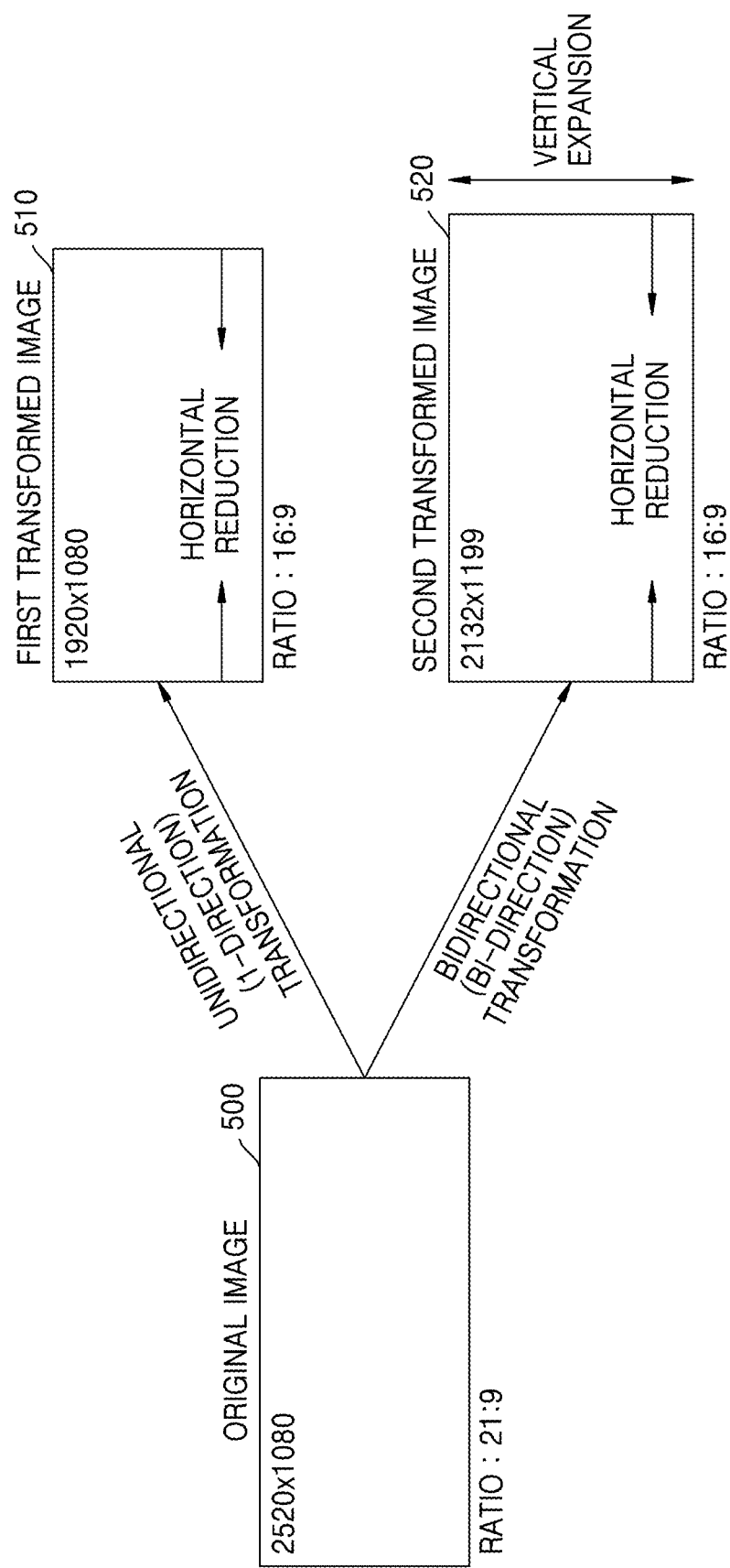

FIGS. 5B and 5C are diagrams for describing a detailed process in which an image processing apparatus adjusts an image ratio through entropy-based saliency density analysis, according to an embodiment of the disclosure.

Referring to FIG. 5B, the image processing apparatus 100 may obtain saliencies A(x,y) based on the original image 500. Referring to FIG. 5C, the original image 500 may have a resolution of 2520×1080 and a ratio of 21:9. In order to adjust an image ratio to 16:9, the image processing apparatus 100 may determine A(x) and A(y) based on the saliencies A(x,y) and determine H(A(x)) and H(A(y)) based on A(x) and A(y). The image processing apparatus 100 may determine an adjustment ratio $R_{hor}$ in a horizontal direction and an adjustment ratio $R_{ver}$ in a vertical direction based on H(A(x)) and H(A(y)). For example, the adjustment ratio $R_{hor}$ and adjustment ratio $R_{ver}$ may be determined by using Equation 1, described above, and obtained as $R_{hor}$=0.648 and $R_{ver}$=0.352.

The image processing apparatus 100 may adjust an image ratio in both directions based on $R_{hor}$ and $R_{ver}$.

Referring to FIG. 5C, when only the horizontal direction is adjusted, in order to adjust the image ratio to 16:9, a first transformed image 510 may be generated by reducing the size of an image by 600 pixels in the horizontal direction.

The image processing apparatus 100 may determine the number of adjustment pixels in one direction by using a greater value of $R_{hor}$ and $R_{ver}$, based on the number of pixels that are reduced when only one direction is adjusted. For example, referring to FIG. 5C, the image processing apparatus 100 may reduce the size of the image to 2132 pixels in the horizontal direction, by reducing the size by 600 pixels× $R_{hor}$=388 pixels in the horizontal direction.

The image processing apparatus 100 may determine the number of adjustment pixels in other directions to match the image ratio. For example, referring to FIG. 5C, in order to adjust the image ratio to 16:9, the image processing apparatus 100 may expand the size of the image to 1199 pixels in the vertical direction, by increasing the size by 119 pixels in the vertical direction. Accordingly, the image processing apparatus 100 may output a second transformed image 520 having an image ratio of 16:9 and an image resolution of 2132×1199.

FIG. 6 is a diagram for describing a process in which an image processing apparatus selectively adjusts an aspect ratio while improving the image quality of a peripheral region by generating a saliency guidance map, according to an embodiment of the disclosure.

Referring to FIG. 6, the image processing apparatus 100 may generate a saliency map 610 based on an original image 600.

Also, the image processing apparatus 100 may generate a texture map 620 based on the original image 600. The texture map 620 may include a value related to a gradient of texture edges in various directions, and additional weights for increasing the sharpness of an image may be determined through the texture map 620.

The image processing apparatus 100 may generate an inverse map 615 based on the saliency map 610. The reason for generating the inverse map 615 is explained below.

Because a saliency value of an object region is large and a saliency value of a peripheral region is small in the saliency map 610, when a saliency guidance map 630 is generated by combining (e.g., multiplying) the saliency values with the texture map 620, the value is large in the object region and the value is small in the peripheral region.

This is because, when the values are used as additional weights, over-sharpening may occur due to a sharpness improvement of the object region. Distortion may occur in the object region due to the over-sharpening. That is, because the object region is preserved without being upscaled or downscaled by the selective transformation described with reference to FIG. 4A, there is little deterioration in image quality even by transformation, and over-sharpening may occur by improving the sharpness in such a state.

In addition, because the value is small in the peripheral region, when the value is used as an additional weight, a sharpness improvement of the peripheral region may be relatively small than that of the object region. Accordingly, while distortion may occur in the peripheral region upscaled or downscaled by the selective transformation described with reference to FIG. 4A, image quality improvement of the peripheral region is small. To solve this problem, the image processing apparatus 100 may generate an inverse map of the saliency map 610.

The image processing apparatus 100 may generate the saliency guidance map 630 by combining the inverse map 615 with the texture map 620. For example, the image processing apparatus 100 may generate a pixel value of the saliency guidance map 630 by multiplying a pixel value of the inverse map 615 by a pixel value of the texture map 620. However, the disclosure is not limited thereto, and the saliency guidance map 630 may be generated based on the inverse map 615 and the texture map 620 in various manners. The saliency guidance map 630 may include additional weights for improving image quality.

The image processing apparatus 100 may generate a scale weight map 640 by using the saliency map 610. The image processing apparatus 100 may output a transformed image 650 based on a scale weight of the scale weight map 640 and the additional weights of the saliency guidance map 630.

Figure 7A:
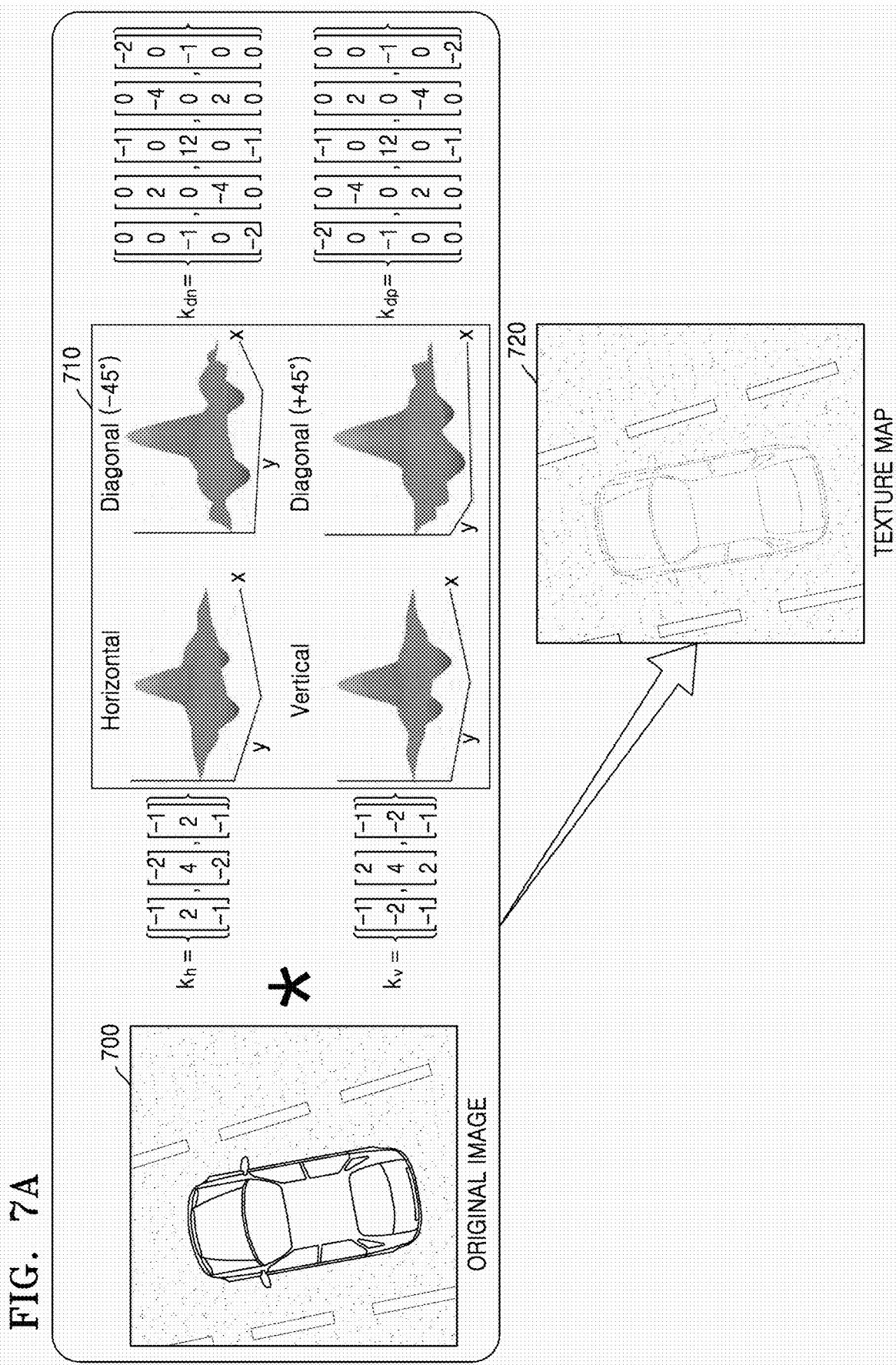
FIG. 7A is a diagram for describing a process in which an image processing apparatus extracts a texture map, according to an embodiment of the disclosure.

FIG. 7A is a diagram for describing a process in which an image processing apparatus extracts a texture map, according to an embodiment of the disclosure.

The image processing apparatus 100 may determine a gradient of edges in various directions by applying a filter kernel 710 to an original image 700. In this regard, applying the filter kernel 710 may correspond to a convolution operation of a matrix of an original image and a matrix of a filter kernel.

In this case, the filter kernel is a second derivative (or differential) kernel in any of various directions, and the shape thereof may be as illustrated in FIG. 7A, but a coefficient thereof may be different. In particular, the size of a kernel of a filter may be 3×3 or 5×5 as illustrated in FIG. 7A, in consideration of the amount of computation, but is not limited thereto and may have various shapes. For example, a Laplacian kernel or another simple second derivative kernel may be used as the kernel. A sum of all coefficients of the second derivative kernel may be 0.

In detail, the image processing apparatus 100 may obtain a differential value (e.g., second differential value) in each direction based on the filter kernel. For example, the image processing apparatus 100 may obtain second different values in four directions based on the following equation.

[Equation 2]

$$R_h^2(m, n) = \sum_{s=-1}^{1}\sum_{t=-1}^{1} h_y(s, t)I(m-s, n-t), \quad (1)$$

-continued $$R_v^2(m, n) = \sum_{s=-1}^{1}\sum_{t=-1}^{1} h_x(s, t)I(m-s, n-t), \quad (2)$$

$$R_{dn}^2(m, n) = \sum_{s=-2}^{2}\sum_{t=-2}^{2} h_{dn}(s, t)I(m-s, n-t), \quad (3)$$

$$R_{dp}^2(m, n) = \sum_{s=-2}^{2}\sum_{t=-2}^{2} h_{dp}(s, t)I(m-s, n-t), \quad (4)$$

where (m,n) may be a spatial domain coordinate, and I may be a grayscale image of an original image. and $R_h^2$ and $r_v^2$ may be differential values in horizontal and vertical directions, respectively, and $R_{dn}^2$ and $r_{dp}^2$ may be differential values in a −45 degree and 45 degree directions, respectively. Because the differential values are not in a range between −1 and 1, an edge guidance map in each direction may be obtained based on a Sigmund function S( ) as in the following equation.

$$D_x^2(m, n) = S(R_h^2(m, n)),$$ [Equation 3]

$$D_y^2(m, n) = S(R_v^2(m, n)),$$

$$D_{dn}^2(m, n) = S(R_{dn}^2(m, n)),$$

$$D_{dp}^2(m, n) = S(R_{dp}^2(m, n))$$

where, $$S(x) = \frac{x}{\sqrt{1+x^2}}$$

The image processing apparatus 100 may generate a texture map E(m,n) 720 based on the following equation.

$$E(m,n) = S(D_x^2(m,n) + D_y^2(m,n) + D_{dn}^2(m,n) + D_{dp}^2(m,n))$$ [Equation 4]

A pixel value of the texture map E(m,n) 720 may be a value between −1 and 1. A corresponding pixel value of the texture map E(m,n) 720 may be based on a gradient of an edge in each direction. In particular, a corresponding pixel value of the texture map E(m,n) 720 may be based on a gradient of a beginning and an end of a texture edge, and therefore, by assigning a large additional weight according to a change in a pixel value near the edge, the sharpness of the texture edge may be improved.

Figure 7B:
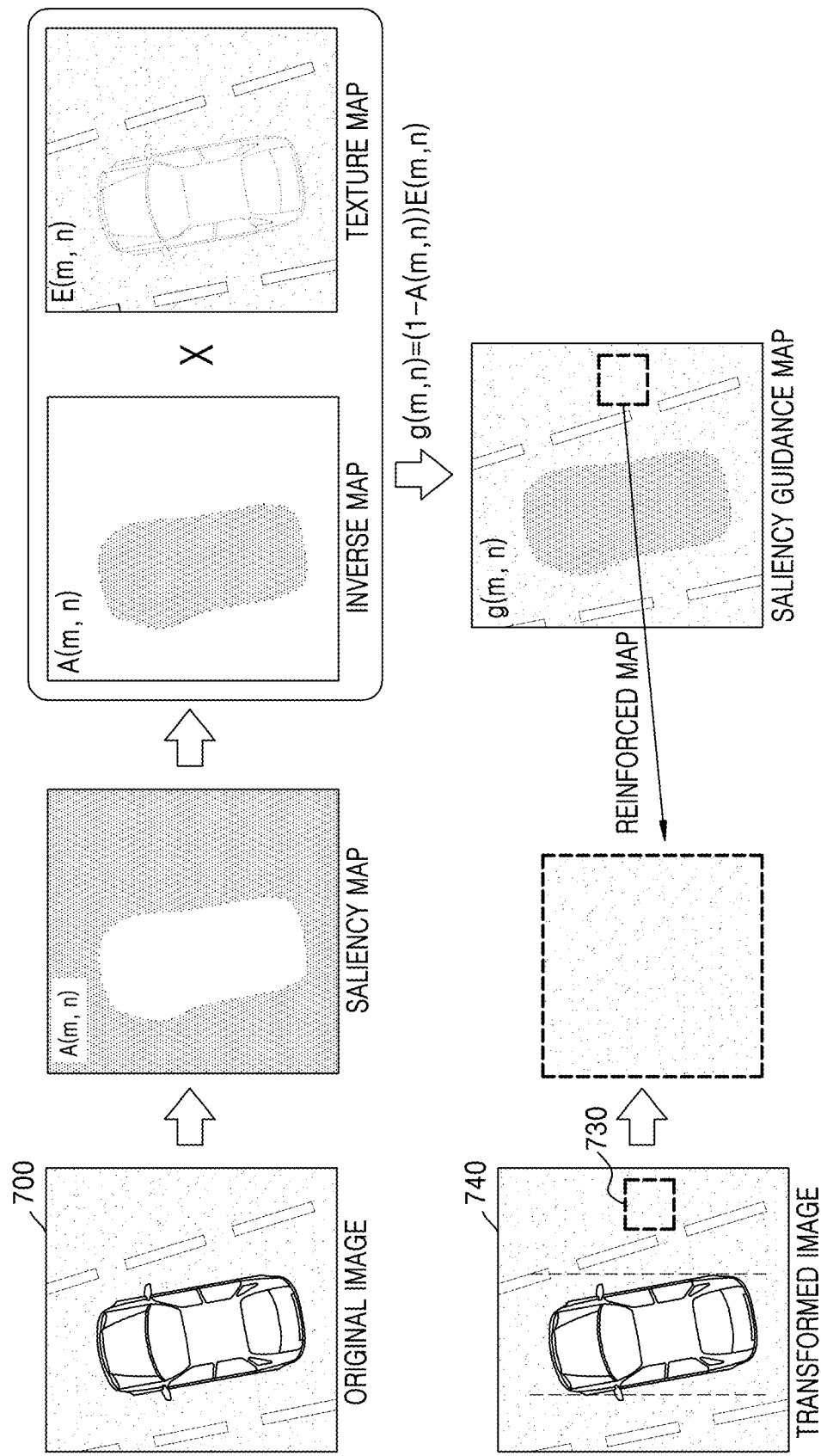
FIG. 7B is a diagram for describing a process in which an image processing apparatus extracts a saliency guidance map by using a texture map, according to an embodiment of the disclosure.

FIG. 7B is a diagram for describing a process in which an image processing apparatus extracts a saliency guidance map by using a texture map, according to an embodiment of the disclosure.

Referring to FIG. 7B, the image processing apparatus 100 may obtain a saliency map A(m,n) by using the original image 700. The image processing apparatus 100 may obtain an inverse map 1−A(m,n) based on the saliency map A(m,n). The image processing apparatus 100 may obtain a saliency guidance map g(m,n) by combining the inverse map 1−A(m,n) with a texture map E(m,n). For example, the image processing apparatus 100 may obtain the saliency guidance map g(m,n) based on equation: g(m,n)=(1−A(m,n))×E(m,n).

The image processing apparatus 100 may use the saliency guidance map g(m,n) as an additional weight, in order to improve deterioration in image quality occurring in a transformed image 740 caused by distortion of a peripheral region 730. The image quality of the peripheral region 730 may be improved by applying the saliency guidance map g(m,n) to the transformed image 740, but the disclosure is not limited thereto. When the original image 700 is scaled by a scale weight, an additional weight may be applied to the value of the saliency guidance map g(m,n), so that the image quality of the peripheral region 730 may be improved together with scaling.

FIG. 8A illustrates a pseudocode in a horizontal upscale case, according to an embodiment of the disclosure.

Referring to FIG. 8A, the image processing apparatus 100 may perform an operation within the 'for' statement until a variable i (which is a column number of a transformed image) becomes a target image width $W_{out}$ from 1. When a scale weight $S(m_j)$ at an x-coordinate $m_j$ of a pixel located in an n-th row and a j-th column of an original image is greater than 1, the image processing apparatus 100 may determine a pixel value $T(m_i,n)$ of a target pixel (or transformed pixel) in a target image (or transformed image) as $(1+g(m_j,n))*I(m_j,n)$ and subtract 1 from the scale weight $S(m_j)$. That is, when the scale weight $S(m_j)$ of an original pixel in an input image (or original image) is greater than 1, in order to generate one transformed pixel, $T(m_i,n)$ may be calculated by setting the scale weight to 1 and an additional weight to $g(m_j,n)$, and the value of i may be increased by 1 (the value of j remains the same).

With respect to the value of i increased by 1, when the scale weight $S(m_j)$ of the original pixel in the input image (original image) is greater than or equal to 1, $T(m_i,n)$ may be calculated through the same operation as described above, where $S(m_j)$ may decrease by 1. When the scale weight $S(m_j)$ of the original pixel in the input image (original image) is less than 1, $T(m_i,n)$ may be calculated by using the scale weight $S(m_j)$, the additional weight $g(m_j,n)$, an input pixel value $I(m_j,n)$, an additional weight $g(m_{j+1},n)$, and an input pixel value $I(m_{j+1},n)$. In this regard, a scale weight $S(m_{j+1})$ may be determined as $S(m_{j+1})-(1-S(m_j))$, where the value of j may increase by 1.

That is, to sum up, when the scale weight of the original pixel is greater than or equal to 1, the image processing apparatus 100 may determine a pixel value of a next transformed pixel by multiplying the original pixel by 1, subtracting 1 from the scale weight, and using the remaining scale weight after subtraction. That is, until the scale weight becomes less than 1, a pixel value of at least one transformed pixel may be determined by setting the scale weight to 1 and using a pixel value of the corresponding original pixel. However, when the scale weight is less than 1, a scale weight of the corresponding original pixel (a first original pixel) and a scale weight of an original pixel (a second original pixel) in an immediately adjacent next column may be used. Because there is no more scale weight of the first original pixel to be used, the pixel value of the next transformed pixel may be used by using the scale weight of the second original pixel.

By repeating the aforementioned operation until a current column number corresponds to a target image width $W_{out}$, a transformed image may be output. Hereinafter, the aforementioned operation will be described with a simple example.

For example, when n=160, S(1)=1.5, S(2)=1.5, and $W_{out}$ is 3, the image processing apparatus 100 may determine T(1,160) as (1+g(1,160))*I(1,160).

Then, S(1)=1.5−1=0.5, and the image processing apparatus 100 may determine T(2,160) as 0.5*(1+g(1,160))*I(1, 160)+0.5*(1+g(2,160))*I(2,160), where 0.5 of 0.5*(1+g(2, 160)) is a part of the value of S(2), and after T(2,160) is determined, S(2)=1.5+0.5−1=1.

The image processing apparatus 100 may determine T(3, 160) as (1+g(2,160))*I(2,160). Then, S(2)=1−1=0, and no further operation may be performed. As a result, a transformed pixel value in the transformed image of T(1,360) to T(3,160) may be determined. That is, a transformed image whose width is expanded by 1.5 times from the existing I(1,160) to (2,160) may be obtained.

Figure 8B:
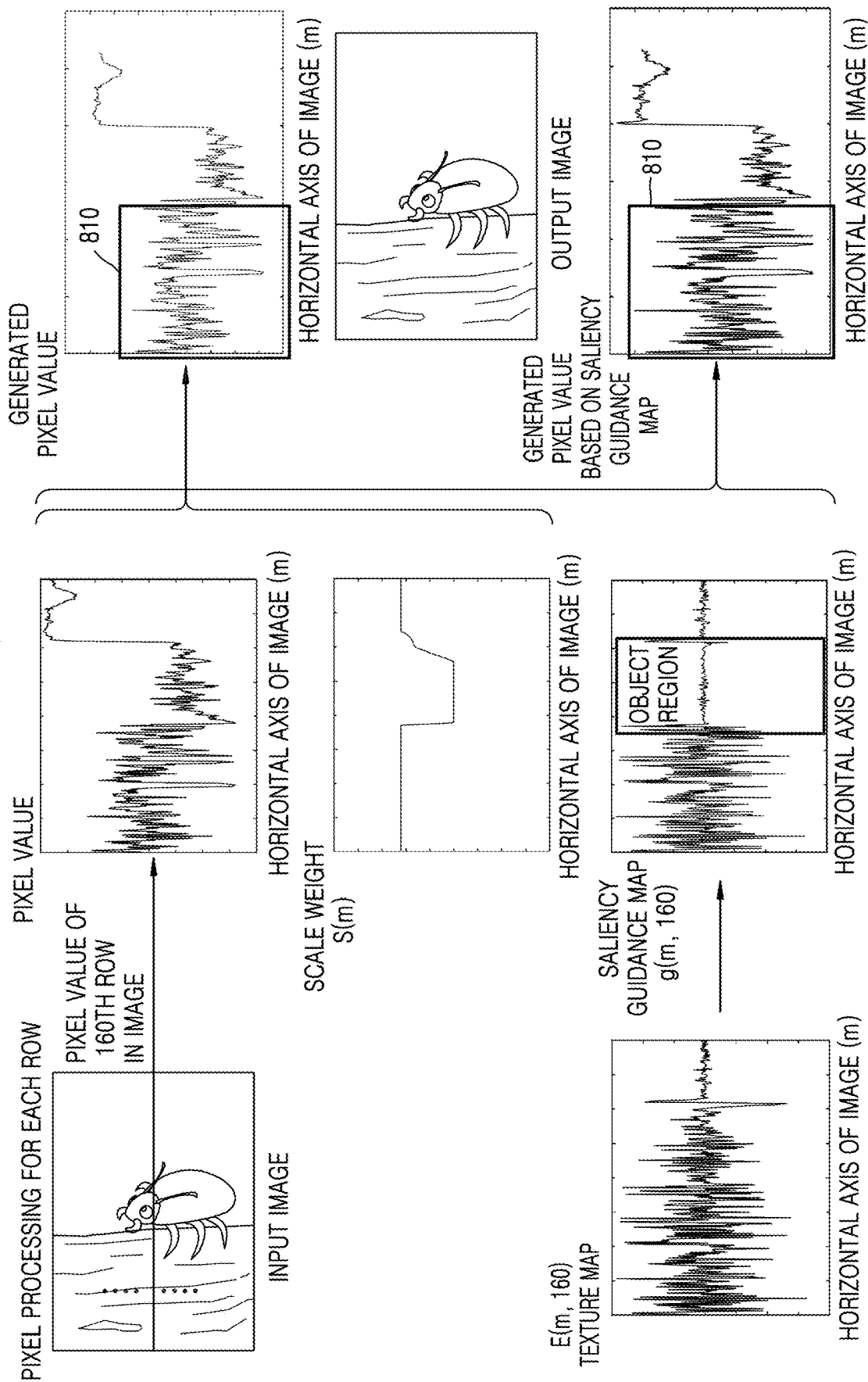
FIG. 8B is a diagram for describing a difference between a transformed pixel value generated based on an additional weight and a transformed pixel value generated without an additional weight according to the pseudocode in the horizontal upscale case of FIG. 8A.

FIG. 8B is a diagram for describing a difference between a transformed pixel value generated based on an additional weight and a transformed pixel value generated without an additional weight according to the pseudocode in the horizontal upscale case of FIG. 8A.

Referring to FIG. 8B, the image processing apparatus 100 may obtain an output image (transformed image) from an input image by processing the pseudocode in the horizontal upscale case of FIG. 8A for each row.

Hereinafter, for convenience of description, only a process in which the image processing apparatus 100 obtains a pixel value of a 160th row in the output image by processing the 160th row will be described. Therefore, it is noted that all information described below is limited to information about the 160th row.

The image processing apparatus 100 may obtain a texture map $E(m,160)$ based on the input image. The image processing apparatus 100 may obtain a saliency guidance map $g(m,160)$ based on the texture map $E(m,160)$. A value in an object region of the saliency guidance map $g(m,160)$ may be close to 0. That is, an additional weight may be a value close to 0.

The image processing apparatus 100 may generate a pixel value $T(m',160)$ based on a pixel value $I(m,160)$, a scale weight $S(m)$, and the saliency guidance map $g(m,160)$.

Moreover, the image processing apparatus 100 may generate a pixel value $T'(m',160)$ based on the pixel value $I(m,160)$ and the scale weight $S(m)$ without using the saliency guidance map $g(m,160)$.

In this regard, it may be seen that a range of variation of a pixel value of a part where a grid of pixels is expanded, such as a peripheral region 810, is greater based on a saliency guidance map than when not based on the saliency guidance map, and as the range of variation of the pixel value increases, a texture edge may be more emphasized, thereby improving image quality.

FIG. 9A illustrates a pseudocode in a horizontal downscale case, according to an embodiment of the disclosure.

Referring to FIG. 9A, the image processing apparatus 100 may perform an operation within the 'for' statement until a variable i (a column number of a transformed image) becomes a target image width $W_{out}$ from 1. The image processing apparatus 100 may repeatedly perform an operation in the 'while' statement only when temp_S is less than 1 in the 'for' statement.

The image processing apparatus 100 may set a scale weight $S(m_j)$ at an x-coordinate $m_j$ of a pixel located in an n-th row and a j-th column in an original image as a variable temp_S, and when temp_S is less than 1 and a sum of temp_S and $S(m_{j+1})$ is greater than 1, may determine the value of a pixel value $T(m_i,n)$ of a target pixel (transformed pixel) in a target image (transformed image) as a sum of previously determined $T(m_i,n)$ and $(1-\text{temp\_S})*(1+g(m_{j+1},n))*I(m_{j+1},n)$, and determine $S(m_{j+1})$ as a value obtained by subtracting 1−temp_S from previous $S(m_{j+1})$. Thereafter, the operation of the 'while' statement is no longer executed through break.

Moreover, when the sum of temp_S and $S(m_{j+1})$ is less than or equal to 1, the image processing apparatus 100 may determine the value of the pixel value $T(m_i,n)$ of the target pixel in the target image as a sum of previously determined $T(m_i,n)$ and $S(m_{j+1})*(1+g(m_{j+1},n))*I(m_{j+1},n)$, determine the value of temp_S as a value obtained by adding $S(m_{j+1})$ to previous temp_S, and increase the value of j by 1.

That is, to sum up, in order to determine a pixel value of a current transformed pixel, the image processing apparatus 100 may first determine $T(m_i,n)$ based on a weight and an additional weight of a current original pixel, and a pixel value of the current original pixel (first original pixel), and when a sum of a scale weight of a next original pixel (second original pixel) and a scale weight of the current original pixel (first original pixel) is less than 1, may determine new $T(m_i,n)$ by adding, to previously determined $T(m_i,n)$, all weights and an additional weight of the next original pixel (second original pixel), and a pixel value of the next original pixel (second original pixel). In this regard, final $T(m_i,n)$ may be determined by using the weight, the additional weight, and the pixel value of the next original pixel until the sum of the scale weights becomes 1. In this case, when a weight of an original pixel after the final $T(m_i,n)$ is determined is not 0, $T(m_{i+1},n)$ may be determined based on the weight, an additional weight, and a pixel value of the corresponding original pixel.

By repeating the aforementioned operation until a current column becomes $W_{out}$, a transformed image may be output. Hereinafter, the aforementioned operation will be described with a simple example.

For example, when n=90, S(1)=0.7, S(2)=0.2, S(3)=0.9, and S(4)=0.2, the image processing apparatus 100 may first determine first T(1,90) as (0.7+g(1,90))*I(1,90).

Thereafter, second T(1,90) may be determined as first T(1,90)+(0.2+g(2,90))*I(2,90), and temp_S may be determined as 0.7+0.2. Because temp_S is less than 1, final T(1,90) may be determined as second T(1,90)+(0.1+g(3,90))*I(3,90), and the value of S(3) may be determined as 0.9−0.1=0.8. Thereafter, the value of T(2,90) of a next transformed pixel may be determined.

The image processing apparatus 100 may determine first T(2,90) as (0.8+g(3,90))*I(3,90). Thereafter, second T(2,90) may be determined as first T(2,90)+(0.2+g(4,90))*I(4,90). After that, further operations may not be performed.

As a result, a transformed pixel value in a transformed image of T(1 to 2,90) may be determined. That is, a transformed image whose width is reduced by half from the existing I(1 to 4,90) may be obtained.

FIG. 9B is a diagram for describing a difference between a transformed pixel value generated based on an additional weight and a transformed pixel value generated without an additional weight according to the pseudocode in the horizontal downscale case of FIG. 9A.

Referring to FIG. 9B, the image processing apparatus 100 may obtain an output image (transformed image) from an input image by processing the pseudocode in the horizontal downscale case of FIG. 9A for each row.

Hereinafter, for convenience of description, only a process in which the image processing apparatus 100 obtains a pixel value of a 90th row in the output image by processing the 90th row will be described. Therefore, it is noted that all information described below is limited to information about the 90th row.

The image processing apparatus 100 may obtain a texture map $E(m,90)$ based on the input image. The image processing apparatus 100 may obtain a saliency guidance map $g(m,90)$ based on the texture map $E(m,90)$. A value in an object region of the saliency guidance map $g(m,90)$ may be close to 0. That is, an additional weight may be a value close to 0.

The image processing apparatus 100 may generate a pixel value $T(m',90)$ based on a pixel value $I(m,90)$, a scale weight $S(m)$, and the saliency guidance map $g(m,90)$.

Moreover, the image processing apparatus 100 may generate a pixel value T'(m',90) based on the pixel value I(m,90) and the scale weight S(m) without using the saliency guidance map g(m,90).

In this regard, it may be seen that a range of variation of a pixel value of a part where a grid of pixels is expanded, such as a peripheral region 910, is greater based on a saliency guidance map than that not based on the saliency guidance map, and as the range of variation of the pixel value increases, a texture edge may be more emphasized, thereby improving image quality.

Figure 10:
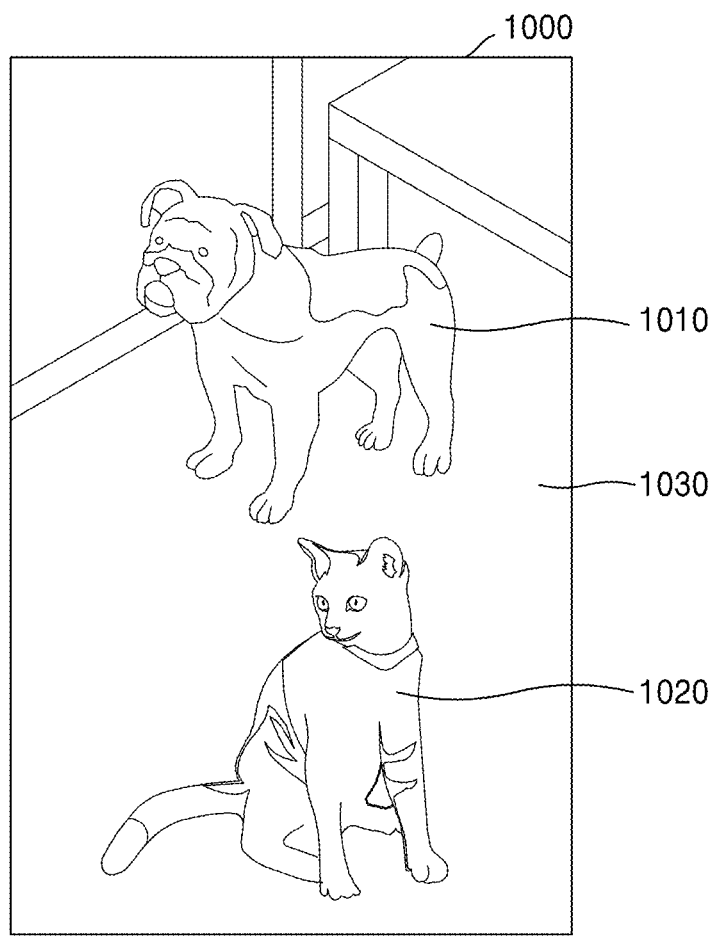
FIG. 10 is a diagram for describing a process in which an image processing apparatus generates a transformed image when an original image includes a plurality of object regions, according to an embodiment of the disclosure.

FIG. 10 is a diagram for describing a process in which an image processing apparatus 100 generates a transformed image when an original image includes a plurality of object regions, according to an embodiment of the disclosure.

Referring to FIG. 10, an original image 1000 may include a plurality of object regions 1010 and 1020. The image processing apparatus 100 may obtain a saliency map in which the plurality of object regions 1010 and 1020 and a peripheral region 1030 are distinguished from each other, determine a scale weight and an additional weight based on the saliency map, as described above, and determine a pixel value of a transformed pixel in a transformed image by using the scale weight, the additional weight, and a pixel value of an original pixel. In this regard, the transformed image may be obtained by preserving the plurality of object regions 1010 and 1020 based on the scale weight, and expanding or reducing (upscaling or downscaling) a pixel grid of the peripheral region 1030. In particular, deterioration in image quality, which may occur due to expansion or reduction of the pixel grid of the peripheral region 1030, may be improved based on the additional weight. In the above, performing image processing by using an original image including one object region as an input image has been described, but the disclosure is not limited thereto. As shown in FIG. 10, the original image may include a plurality of object regions, and it should be understood by those of ordinary skill in the art that the same technical effect may be achieved by performing image processing on the original image including a plurality of object regions.

FIG. 11 is a flowchart of an image processing method of an image processing apparatus, according to an embodiment of the disclosure.

In operation S1110, the image processing apparatus 100 may determine a scale weight for original pixels in an original image based on first attribute-related information about the original image. The scale weight is a weight for expanding or reducing a pixel grid, and one scale weight or a sum of a plurality of scale weights may have a certain value and be used to calculate one transformed pixel in a transformed image. The certain value may be 1, but is not limited thereto. Here, the first attribute-related information may be information set by dividing the original image into an object region and a peripheral region. For example, the first attribute-related information may be a first attribute-based map, and the first attribute-based map may be a saliency map or a depth map for the original image. In this regard, the object region is a region where a user's level of interest (saliency) is high or which is located close in the original image and may be preserved without distortion. Therefore, the object region may have a scale weight of 1 or a value within a certain range including or around 1. The peripheral region is a region where the user's level of interest (saliency) is low or which is the same as a background region located at a distance in the original image. When the height or width of the original image increases, the value of the scale weight may be greater than 1, and when the height or width of the original image decreases, the value of the scale weight may be less than 1. The disclosure is not limited thereto, and may be a value outside of the certain range, the certain range including or around 1.

In operation S1120, the image processing apparatus 100 may determine an additional weight for original pixels in a peripheral region based on the first attribute-related information and second attribute-related information about the original image. The additional weight is a weight used to improve the image quality of a distorted part of an image due to the scaling, and may be a weight calculated based on a gradient around an edge in at least one direction. That is, based on the additional weight, a difference in pixel values between adjacent pixels may be increased in a part having a large gradient around the edge, and accordingly, the edge may be sharpened, thereby increasing the sharpness of a region including the edge.

The second attribute-related information may be information based on a change amount between pixel values of adjacent pixels. For example, the second attribute-based map corresponding to the second attribute-related information may include a texture map based on a change rate with respect to a difference value between pixel values of original pixels.

The image processing apparatus 100 may generate a guide map based on the second attribute-based map. The guide map may include an additional weight, and the guide map may include a map generated based on a saliency map and a texture map. That is, the guide map is a map where an object region and a peripheral region are separately set, and an additional weight for the object region may be 0, but is not limited thereto, and may be within a certain range including or around 0. The additional weight for the peripheral region may be greater than or equal to −1 or less than or equal to −1. For example, the additional weight for the peripheral region may be a value outside of the certain range, the certain range including or around 0.

The guide map may be a saliency guidance map where an inverse map of a saliency map and a texture map are combined. While the description has been made based on the saliency map, the disclosure is not limited thereto, and those of ordinary skill in the art would understand that the saliency map may be replaced with a depth map or a scale weight map in which an object region and a peripheral region are separately set.

In operation S1130, the image processing apparatus 100 may obtain a transformed image whose size is changed from the original image by applying the scale weight and the additional weight to the original pixels in the original image. In this regard, one scale weight or a sum of a plurality of scale weights used to calculate a pixel value of one transformed pixel among transformed pixels in the transformed image may be a certain value. The certain value may be 1, but is not limited thereto.

According to various embodiments of the disclosure, the image processing apparatus 100 may prevent deterioration in image quality of the peripheral region, by performing scaling on the peripheral region while preserving the object region based on the scale weight. That is, when a ratio of an image and a display ratio of any of various display apparatuses (e.g., smartphones) do not match, in order to provide a full screen, scaling of the image is required. In this case, by performing the transformation (or scaling) according to various embodiments of the disclosure, it is possible to minimize the deterioration in the image quality of the peripheral region while preserving the object region.

Also, a user may experience a full screen image. For example, when a ratio of a TV image is 16:9, but a display ratio of a smartphone is 18.5:9, the user may experience a full-screen TV image by scaling the TV image to match the display ratio of the smartphone. Therefore, the user may be more immersed in the image.

Also, the image processing apparatus 100 may generate an image with the effect of transforming a view by performing scaling (e.g., transformation or resizing) on the peripheral region while preserving the object region based on the scale weight, and may use the same in the field of three-dimensional (3D) and/or light field imaging. In particular, when constructing a training database for a deep neural network used in the field of 3D/light field imaging, a transformed image with the effect of transforming a view from the original image is generated, and the original image and the transformed image are included in the training database. In other words, database augmentation that creates artificial data by using existing data becomes possible.

Also, the image processing apparatus 100 may minimize image distortion by adjusting (e.g., scaling) an image ratio in both directions through analysis of an entropy-based saliency density.

In addition, the image processing apparatus 100 may improve deterioration in image quality due to distortion caused by resizing of the peripheral region, by using attribute data about the original image, as in a texture map, to improve image quality. In this case, the image quality may be selectively improved in the peripheral region where distortion may otherwise occur due to resizing, by using together attribute data about the original image, as in a saliency map, in which the object region and the peripheral region are separately set.

In particular, by applying the scale weight and the additional weight to the original image at once, the image processing apparatus 100 may preserve the object region and improve deterioration in image quality of the scaled peripheral region. Because the scale weight and the additional weight are coefficients of a type of post-processing filter, by applying the scale weight and the additional weight to an original image obtained by various methods, an image with little deterioration in image quality may be reproduced on a display apparatus while an aspect ratio may be scaled to fit the display apparatus.

The disclosure may be implemented in a computer-readable storage medium, which may be provided in the form of a non-transitory storage medium. Here, the term 'non-transitory storage medium' means that the storage medium is a tangible entity and does not include a signal (e.g., an electromagnetic wave) only, and the term does not distinguish that data is stored semi-permanently or temporarily on the storage medium. For example, the 'non-transitory storage medium' may include a buffer in which data is temporarily stored.

According to an embodiment of the disclosure, a method according to various embodiments of the disclosure may be provided in a computer program product. A computer program product may be traded between sellers and buyers as commodities. The computer program product may be distributed in the form of a machine-readable storage medium (e.g., CD-ROM), or may be distributed online (e.g., downloaded or uploaded) through an application store (e.g., Play Store™) or directly between two user devices (e.g., smartphones). For online distribution, at least a part of the computer program product (e.g., a downloadable app.) may be temporarily generated or be at least temporarily stored in a machine-readable storage medium such as a manufacturer's server, an application store's server, or a memory of a relay server.

While the present disclosure has been described with reference to example embodiments thereof, it will be apparent to those of ordinary skill in the art that various changes and modifications may be made thereto without departing from the spirit and scope of the present disclosure as set forth in the following claims and their equivalents.

The invention claimed is:

1. An image processing apparatus comprising:
  a memory configured to store one or more instructions; and
  a processor configured to execute the one or more instructions stored in the memory to:
    determine a scale weight for each pixel of original pixels in an entire original image comprising an object region and a peripheral region based on first attribute-related information about the original image, the first attribute-related information comprising pixel value for distinguishing the object region and the peripheral region in the original image;
    determine an additional weight for at least one pixel of the original pixels in the peripheral region, based on the first attribute-related information and second attribute-related information about the original image, the second attribute-related information being based on an amount of a change between pixel values of adjacent pixels; and
    obtain a transformed image of which a size is changed from the original image, by applying at least one of the scale weight and the additional weight to corresponding pixels of the original pixels in the original image to obtain a pixel value of a transformed pixel in the transformed image.

2. The image processing apparatus of claim 1, wherein the processor is further configured to execute the one or more instructions to, based on the scale weight and the additional weight being applied to the corresponding pixels of the original pixels in the original image, obtain a weighted sum of the corresponding pixels of the original pixels based on a weight in which the scale weight and the additional weight are reflected, and
  wherein the pixel value of the transformed pixel in the transformed image corresponds to the weighted sum of the original pixels obtained based on the weight.

3. The image processing apparatus of claim 1, wherein the processor is further configured to execute the one or more instructions to:
  generate a first attribute-based map corresponding to the first attribute-related information about the original image;
  determine the scale weight for each pixel of the original pixels based on the first attribute-based map;
  generate a second attribute-based map corresponding to the second attribute-related information about the original image; and
  determine a guide map comprising the additional weight for the peripheral region based on the first attribute-based map and the second attribute-based map.

4. The image processing apparatus of claim 3, wherein the first attribute-based map comprises a saliency map for the original image or a depth map for the original image, and wherein the second attribute-based map comprises a texture map based on a change rate with respect to a difference value between pixel values of the original pixels.

5. The image processing apparatus of claim 4, wherein the guide map includes a saliency guidance map in which an inverse map of the saliency map and the texture map are combined.

6. The image processing apparatus of claim 3, wherein, based on the transformed image having a size greater than that of the original image, the scale weight obtained based on the first attribute-based map is determined as a certain first value for the object region and determined as a value greater than the certain first value for the peripheral region, or wherein, based on the transformed image having a size less than that of the original image, the scale weight based on the first attribute-based map is determined as a certain second value for the object region and determined as a value less than the certain second value for the peripheral region.

7. The image processing apparatus of claim 3, wherein a density of the first attribute-based map is obtained based on entropy, and change ratios in a vertical direction and a horizontal direction are obtained based on the density, and wherein, based on the change ratios in the vertical direction and the horizontal direction, in the transformed image of which the size is changed from the original image, a height of the original image is changed in the vertical direction and a width of the original image is changed in the horizontal direction.

8. The image processing apparatus of claim 1, wherein, in obtaining the transformed image of which the size is changed from the original image, both the scale weight and the additional weight, which has a value that is not zero, are applied to the at least one pixel in the peripheral region of the original image.

9. An image processing method comprising:
    determining a scale weight for each pixel of original pixels in an entire original image comprising an object region and a peripheral region based on first attribute-related information about the original image, the first attribute-related information comprising pixel value for distinguishing the object region and the peripheral region in the original image;
    determining an additional weight for at least one pixel of the original pixels in the peripheral region, based on the first attribute-related information and second attribute-related information about the original image, the second attribute-related information being based on an amount of a change between pixel values of adjacent pixels; and
    obtaining a transformed image of which a size is changed from the original image, by applying at least one of the scale weight and the additional weight to corresponding pixels of the original pixels in the original image to obtain a pixel value of a transformed pixel in the transformed image.

10. The image processing method of claim 9, wherein the obtaining of the transformed image further comprises obtaining a weighted sum of the corresponding pixels of the original pixels based on a weight in which the scale weight and the additional weight are reflected, and
    wherein the pixel value of the transformed pixel in the transformed image corresponds to the weighted sum of the corresponding pixels of the original pixels obtained based on the weight.

11. The image processing method of claim 9, wherein the determining of the scale weight further comprises:
    generating a first attribute-based map corresponding to the first attribute-related information about the original image; and
    determining the scale weight for each pixel of the original pixels based on the first attribute-based map, and
    wherein the determining of the additional weight further comprises:
    generating a second attribute-based map corresponding to the second attribute- related information about the original image; and
    determining a guide map comprising the additional weight for the peripheral region based on the first attribute-based map and the second attribute-based map.

12. The image processing method of claim 11, wherein the guide map includes a saliency guidance map in which an inverse map of a saliency map and a texture map are combined.

13. The image processing method of claim 12, wherein, based on the transformed image having a size greater than that of the original image, the scale weight obtained based on the saliency map is determined as a certain first value for the object region and determined as a value greater than the certain first value for the peripheral region, or
    based on the transformed image having a size less than that of the original image, the scale weight based on the saliency map is determined as a certain second value for the object region and determined as a value less than the certain second value for the peripheral region.

14. The image processing method of claim 12, wherein a density of the first attribute-based map is obtained based on entropy, and change ratios in a vertical direction and a horizontal direction are obtained based on the density, and
    wherein, based on the change ratios in the vertical direction and the horizontal direction, in the transformed image of which the size is changed from the original image, a height of the original image is changed in the vertical direction and a width of the original image is changed in the horizontal direction.

15. A non-transitory computer-readable recording medium having recorded thereon a program which, when executed by at least one processor, causes the at least one processor to perform:
    determining a scale weight for each pixel of original pixels in an entire original image comprising an object region and a peripheral region based on first attribute-related information about the original image, the first attribute-related information comprising pixel value for distinguishing the object region and the peripheral region in the original image;
    determining an additional weight for at least one pixel of the original pixels in the peripheral region, based on the first attribute-related information and second attribute-related information about the original image, the second attribute-related information being based on an amount of a change between pixel values of adjacent pixels; and
    obtaining a transformed image of which a size is changed from the original image, by applying at least one of the scale weight and the additional weight to corresponding pixels of the original pixels in the original image to obtain a pixel value of a transformed pixel in the transformed image.

* * * * *